United States Patent
Onaka et al.

(10) Patent No.: US 6,724,526 B1
(45) Date of Patent: Apr. 20, 2004

(54) INTER-WAVELENGTH LIGHT POWER DEVIATION MONITORING METHOD AND OPTICAL EQUALIZER AND OPTICAL AMPLIFIER UTILIZING THE METHOD

(75) Inventors: Miki Onaka, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 739 days.

(21) Appl. No.: 09/628,811

(22) Filed: Jul. 28, 2000

(30) Foreign Application Priority Data

Sep. 28, 1999 (JP) .......................................... 11-275011

(51) Int. Cl.[7] ................................................ H01S 3/00
(52) U.S. Cl. ................................ 359/337.1; 359/337.12
(58) Field of Search ...................... 359/337.1, 337.11, 359/337.12

(56) References Cited

U.S. PATENT DOCUMENTS

| | | | | |
|---|---|---|---|---|
| 5,909,305 A | * | 6/1999 | Kinoshita | 359/341 |
| 6,212,001 B1 | * | 4/2001 | Bode et al. | 359/341 |
| 6,535,330 B1 | * | 3/2003 | Lelic et al. | 359/337.1 |

FOREIGN PATENT DOCUMENTS

| JP | 9-083489 | 3/1997 |
|---|---|---|
| JP | 9-258117 | 10/1997 |

OTHER PUBLICATIONS

Hyo Sang Kim et al., Actively Gain–Flattened Erbium–Doped Fiber Amplifier Over 35nm by Using All–Fiber Acoustooptic Tunable Filters, IEEE Photonics Technology Letters, vol. 10, No. 6.

M. Takeda et al., Active Gain–Tilt Equalization by Preferentially 1.43 μm–or 1.48 μm Pumpted Raman Amplification, Technical Digest, Optical Amplifiers and Their Applications Nara, Japan, ThA3–1, pp. 76–99.

K. Otsuka, et al., A High–Performance Optical Spectrum Monitor with High–Speed Measuring Time for WDM Optical Networks, ECOC, 97,22–25.

* cited by examiner

Primary Examiner—Mark Hellner
(74) Attorney, Agent, or Firm—Staas & Halsey LLP

(57) ABSTRACT

It is aimed at providing an inter-wavelength light power deviation monitoring method capable of directly measuring the signal light power to thereby detect the light power deviations among channels without requiring a higher wavelength resolution, and providing an optical equalizer and an optical amplifier adopting such a monitoring method. To this end, the monitoring method of the present invention comprises the steps of: obtaining channel information concerning WDM signal light; setting, based on the channel information, at least two measuring wavelength regions; measuring channel light power of the WDM signal light, for only the measuring wavelength regions; and obtaining light power ratio for the respective measuring wavelength regions making use of the measured values, to thereby judge the inter-wavelength light power deviations of the WDM signal light.

14 Claims, 18 Drawing Sheets

FIG.5

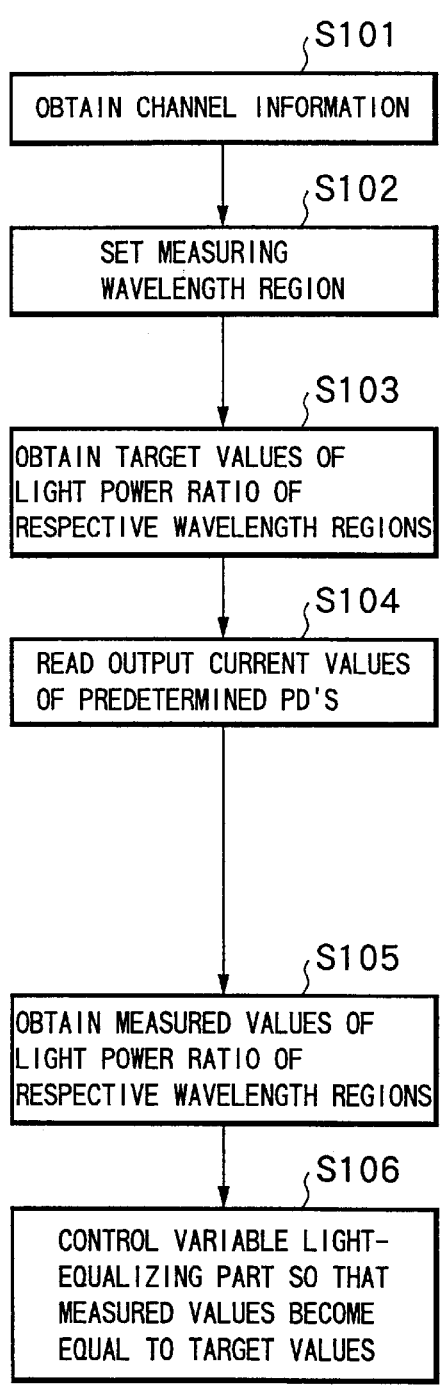

<CONCRETE EXAMPLE>

CHANNELS 1, 2, 3, 16, 17, 32
(EACH 10 Gb/s MODULATION)

WAVELENGTH REGION A: 1535.8 TO 1537.4nm
(INCLUDING CHANNELS 1, 2 AND 3)
WAVELENGTH REGION B: 1560.6nm
(INCLUDING CHANNEL 32)

TARGET VALUE A:B=3:1 (A/B=3)

ELECTRIC CURRENT VALUES:
   WAVELENGTH REGION A:
      PD1: 0.5mA (RECEIVING CHANNEL 1)
      PD2: 0.6mA (RECEIVING CHANNEL 2)
      PD3: 0.7mA (RECEIVING CHANNEL 3)
   WAVELENGTH REGION B:
      PD32: 1.0mA (RECEIVING CHANNEL 32)
      (ELECTRIC CURRENT VALUES OF PD'S
      4 THROUGH 31 ARE NOT READ OUT.)

WAVELENGTH REGION A: 0.5+0.6+0.7=1.8mA
WAVELENGTH REGION B: 1.0mA
MEASURED VALUE A:B=1.8:1 (A/B=1.8)

MEASURED VALUE=TARGET VALUE (A/B=3)

FIG.7

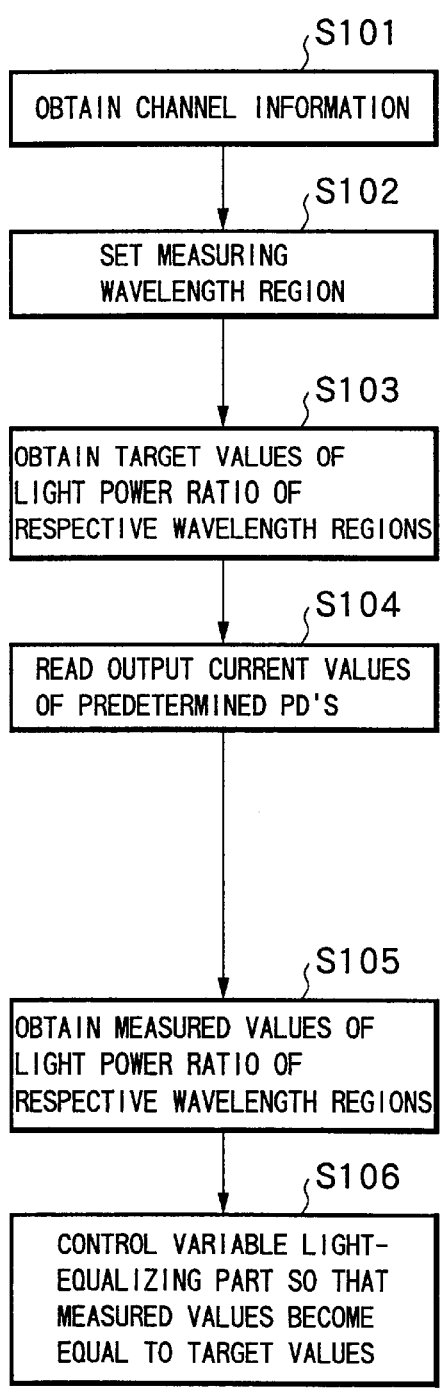

<CONCRETE EXAMPLE>

CHANNELS 1, 2, 3, 16, 17, 32
(EACH 10 Gb/s MODULATION)

WAVELENGTH REGION A: 1535.8 TO 1537.4nm
(INCLUDING CHANNELS 1, 2 AND 3)
WAVELENGTH REGION B: 1560.6nm
(INCLUDING CHANNEL 32)

TARGET VALUE A:B=4:1 (A/B=4)

ELECTRIC CURRENT VALUES:
    WAVELENGTH REGION A:
        PD1:0.5mA (RECEIVING CHANNELS 1 AND 2)
        PD2:0.6mA (RECEIVING CHANNELS 2 AND 3)
    WAVELENGTH REGION B:
        PD16:1.0mA (RECEIVING CHANNEL 32)
        (ELECTRIC CURRENT VALUES OF PD'S
        3 THROUGH 15 ARE NOT READ OUT.)

WAVELENGTH REGION A: 0.5+0.6+0.7=1.1mA
WAVELENGTH REGION B: 1.0mA
MEASURED VALUE A:B=1.1:1 (A/B=1.1)

MEASURED VALUE=TARGET VALUE (A/B=4)

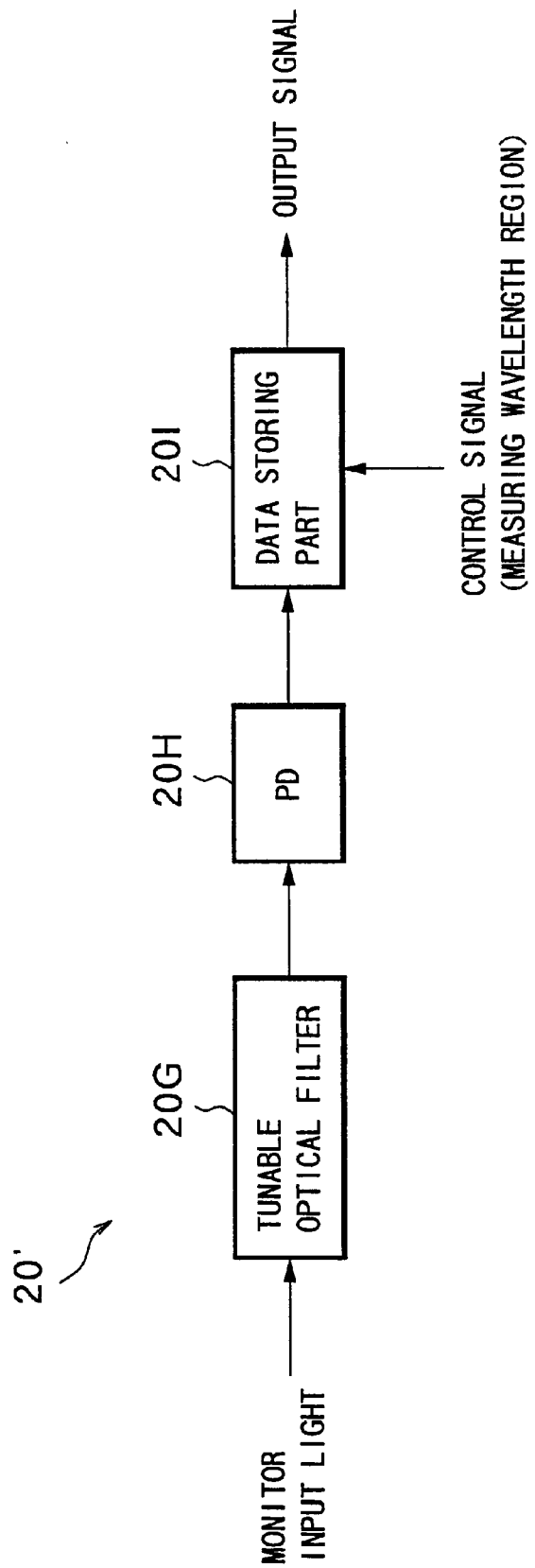

INTER-WAVELENGTH LIGHT POWER DEVIATION MONITORING METHOD AND OPTICAL EQUALIZER AND OPTICAL AMPLIFIER UTILIZING THE METHOD

BACKGROUND OF THE INVENTION

1. Field of the Invention

The present invention relates to an inter-wavelength light power deviation monitoring method for monitoring, by a simple procedure with good precision, the wavelength characteristics of light power of wavelength-division multiplexed (WDM) signal light utilized in various optical communications, and to an optical equalizer and an optical amplifier for controlling the equalizing treatment for the wavelength characteristics of light power of WDM signal light by such a monitoring method.

2. Related Art

In optical communications, research and development have been vigorously done on a wavelength-division multiplexing (WDM) transmission system to increase a communication capacity by transmitting light having a plurality of wavelengths through a single optical fiber. Such a WDM transmission system is expected to become the means for realizing a future multi-media based world, because of such advantages that the system can utilize an existing optical fiber, leading to a lower introduction cost, and that the transmission path of the system can be used in a bit-rate free manner by adopting an optical amplifier having a wider amplification band, leading to easiness of future upgrade.

Generally, in a WDM optical communication system adopting optical amplifiers, in order to obtain predetermined transmission characteristics, it is required to transmit light by suppressing the deviation (tilt) of light power between channels to a few dB or less at each amplification repeating stage. This is because the upper limit of transmittable light power is restricted by the waveform degradation due to a nonlinear effect of an optical transmission path, and the lower limit is restricted by the degradation of a received S/N ratio.

It is known that wavelength characteristics are caused in the loss of an optical fiber transmission path such as due to stimulated Raman scattering or Rayleigh scattering as one of nonlinear effects. Particularly, the loss wavelength characteristics due to stimulated Raman scattering are caused in different magnitudes depending on various transmission conditions such as a length of an optical transmission path, the number of channels (i.e., the number of wavelengths of signal light), channel intervals (wavelength intervals of signal light), and a light power level. Typically, such as the number of channels and the wavelengths to be used in a WDM optical transmission system can be suitably set by a system user, so that the values of them are not always fixed. For example, in a lightwave network, such as the number of signal light and wavelength positions to be input into an optical ADM (Optical Add and Drop Multiplexer) device change dynamically, so that loss wavelength characteristics having different magnitudes are caused in optical transmission paths, leading to a serious problem of affection on transmission characteristics.

With respect further to optical amplifiers and dispersion compensators constituting various optical transmission systems, it is known that wavelength characteristics are included in gains and losses, and it is a problem that such wavelength characteristics in gains and losses cause light power deviations among respective channels, largely affecting on the transmission characteristics.

Thus, it is required to take a countermeasure to monitor light power deviations among respective channels caused in a WDM optical communication system, to thereby reduce such deviations. To this end, the present inventors have proposed such a technique to apply an active gain equalizer to a WDM optical communication system so as to control the characteristics of the gain equalizer such that monitored results of the light power deviations among respective channels are reduced (see Japanese Patent Application Nos. 11-54374 and 11-115971).

Conventional monitoring methods for monitoring the light power deviations among respective channels such as applied to the aforementioned patent applications include a method for calculating the light power deviations among channels based on amplified spontaneous emission (ASE) light generated by optical amplifiers (see Japanese Patent Application No. 11-054374). According to such a method, the spontaneous emission light power near signal light bands are monitored so that the dispersions of light power among respective channels can be monitored independently of the number of input signals or the variation of channels. Further, there is also known a method to directly measure the light power of respective channels such as by a general optical spectrum analyzer to thereby calculate light power deviations among respective channels.

However, those monitoring methods utilizing spontaneous emission light among the conventional methods for monitoring the inter-wavelength light power deviations are ones to indirectly monitor spontaneous emission light rather than directly monitoring signal light itself, leading to the possibility of monitoring error. Also, in those monitoring methods for directly measuring the respective signal light power by using such as an optical spectrum analyzer, since the respective signal light power should be accurately measured even when signal light are input into signal light bands in the densest manner, the measurement of signal light power should be conducted by using such as the high grade optical spectrum analyzer having a superior wavelength resolution, problematically resulting in a large-sized apparatus with higher cost in an apparatus adopting such a monitoring method.

SUMMARY OF THE INVENTION

The present invention has been carried out in view of the conventional problems as described above, and it is therefore an object of the present invention to provide a monitoring method capable of directly measuring the signal light power to thereby detect with high precision the light power deviations among channels without requiring a higher wavelength resolution, and to provide an optical equalizer and an optical amplifier adopting such a monitoring method to thereby attain downsizing and cost reduction.

To achieve the above object, the present invention provides a method for monitoring inter-wavelength light power deviations, comprising the steps of: obtaining channel information concerning WDM signal light including a plurality of wavelength-division multiplexed channel light having wavelengths different from one another, setting, based on the channel information, a plurality of measuring wavelength regions each including at least one distinctive channel light; measuring channel light power of the WDM signal light, for only the respective measuring wavelength regions, and obtaining light power ratio for the respective measuring wavelength regions making use of measured values of said light power, to thereby judge the inter-wavelength light power deviations of the WDM signal light.

According to such a monitoring method: there are set at least two measuring wavelength regions suitable for light power measurement based on the channel information concerning such as the wavelength positions and transmission rates of respective channel light included in the WDM signal light, channel light power for only the respective measuring wavelength regions are measured, and the inter-wavelength light power deviations are judged from the light power ratio for the respective measuring wavelength regions, based on the measured results. In this way, it becomes possible to monitor the wavelength characteristics of WDM signal light power with higher precision while directly measuring the signal light power at a relatively low resolution of wavelength.

Concerning the plurality of measuring wavelength regions each including at least one distinctive channel light, it is possible to arrange such that each of the measuring wavelength regions includes a singular distinctive channel light, and these distinctive channel light are different from one another, or, each of the measuring wavelength regions includes a plurality of channel light, and at least one of the plurality of channel light is different from the remaining measuring wavelength regions. Alternatively, the plurality of measuring wavelength regions are provided by combining the two situations described just above.

Concerning the above monitoring method, the step of setting the measuring wavelength regions may set at least a first measuring wavelength region including the shortest wavelength channel light and a second measuring wavelength region including the longest wavelength channel light, among the input channels. It is desirable to set each of the measuring wavelength regions such that the inclusion ratio of noise light becomes minimum. In this way, it becomes possible to improve the measuring precision of light power deviations of the respective channel light.

Concretely, the step of obtaining the channel information may obtain the channel information including of the wavelength positions and the transmission rates of respective channel light in the WDM signal light, based on monitoring signal light transmitted together with the WDM signal light.

The present invention further provides an optical equalizer for equalizing wavelength characteristics of the light power of WDM signal light including a plurality of wavelength-division multiplexed channel light having wavelengths different from one another, which comprises variable light-equalizing means having a variable light equalizing characteristic, to which is input the WDM signal light, channel information obtaining means for obtaining channel information concerning the WDM signal light; wavelength region setting means for setting, based on the channel information obtained by the channel information obtaining means, a plurality of measuring wavelength regions each including at least one distinctive channel light, light power measuring means for measuring channel light power of the WDM signal light passed through the variable light-equalizing means, for only the respective measuring wavelength regions set by the wavelength region setting means, and controlling means for obtaining, based on the channel information obtained by the channel information obtaining means, target values of light power ratio for the respective measuring wavelength regions, to flatten the light power wavelength characteristics of the WDM signal light and for obtaining measured values of light power ratio for the respective measuring wavelength regions, making use of the measured result of the light power measuring means, to control the light equalizing characteristic of the variable light-equalizing means so that the measured values become equal to the target values, respectively.

Further, one aspect of an optical amplifier according to the present invention incorporating optical amplifying means for collectively amplifying WDM signal light including a plurality of wavelength-division multiplexed channel light having wavelengths different from one another, comprises variable gain equalizing means having a variable gain equalizing characteristic, to which is input the WDM signal light; channel information obtaining means for obtaining channel information concerning the WDM signal light, wavelength region setting means for setting, based on the channel information obtained by the channel information obtaining means, a plurality of measuring wavelength regions each including at least one distinctive channel light, light power measuring means for measuring channel light power of the WDM signal light passed through the variable gain equalizing means, for only the respective measuring wavelength regions set by the wavelength region setting means, and controlling means for obtaining, based on the channel information obtained by the channel information obtaining means, target values of light power ratio for the respective measuring wavelength regions, to flatten the light power wavelength characteristics of the WDM signal light and for obtaining measured values of light power ratio for the respective measuring wavelength regions, making use of the measured result of the light power measuring means, to control the gain equalizing characteristic of the variable gain equalizing means so that the measured values become equal to the target values, respectively.

In the optical equalizer or optical amplifier having the aforementioned constitution, the aforementioned monitoring method according to the present invention is realized by the operations of the channel information obtaining means, wavelength region setting means, light power measuring means and controlling means, and the equalizing characteristic of the variable light-equalizing means or the variable gain equalizing means is feedback controlled corresponding to the monitored result. This enables the provision of a downsized and economical optical equalizer or optical amplifier capable of assuredly conducting the equalizing treatment of light power wavelength characteristics of WDM signal light.

As a concrete constitution of the aforementioned optical equalizer or optical amplifier, the light power measuring means may include a diffraction grating for receiving a part of the WDM signal light passed through the variable light-equalizing means, to thereby generate diffracted light, and a light receiving part which has a plurality of photodetectors arranged corresponding to the arriving positions of respective channel light diffracted by the diffraction grating; and which selects the measured results of light power at the photodetectors corresponding to the respective measuring wavelength regions set by the wavelength region setting means, to pass the thus selected measured results to the controlling means. In addition, the light receiving part can include two or more photodetectors the number of which is equal to or less than the maximum number of channels included in the WDM signal light.

According to the light power measuring means having such a constitution, the channel light power are measured for the corresponding photodetectors, respectively, making use of the light diffraction by the diffraction grating, and the measured results of the photodetectors corresponding to the respective measuring wavelength regions are selectively transmitted to the controlling means.

Alternatively, as another concrete constitution of the light power measuring means, it may include: a variable optical filter, which is input with a part of the WDM signal light passed through the variable light-equalizing means, and which has a central wavelength of a transmission band to be shifted in a timewise manner corresponding to the respective measuring wavelength regions set by the wavelength region setting means; a light receiving part for measuring power of channel light passed through the variable optical filter, and a selecting part for selecting, from measured results at the light receiving part, data corresponding to the respective measuring wavelength regions set by the wavelength region setting means, to transmit the selected data to the controlling means.

According to the light power measuring means having such a constitution, the power of the respective channel light are measured by the light receiving part corresponding to the timewise shift of the transmission band of the variable optical filter, and the measured results of the photodetector, at the time the transmission band of the variable optical filter corresponds to each of the measuring wavelength regions, are selectively transmitted to the controlling means.

Further, as another aspect of the optical amplifier according to the present invention, the optical amplifier incorporating demultiplexing means for demultiplexing WDM signal light including a plurality of wavelength-division multiplexed channel light having wavelengths different from one another into at least two amplification-wavelength bands, at least two optical amplifying means for amplifying optical signals of the respective amplification-wavelength bands, which are demultiplexed by the demultiplexing means, and multiplexing means for multiplexing respective optical signals amplified by the respective optical amplifying means, comprises variable gain equalizing means, which has a variable gain equalizing characteristic and which is provided at the preceding stage of an input side of the demultiplexing means; channel information obtaining means for obtaining channel information concerning the WDM signal light, input power measuring means for receiving a part of optical signals of the respective amplification-wavelength bands to be input into the respective optical amplifying means, to measure the total input-light power into the respective optical amplifying means, and controlling means for obtaining, based on the channel information obtained by the channel information obtaining means, target values of total input-power ratio for respective optical amplifying means, to flatten the light power wavelength characteristics of the WDM signal light and for obtaining measured values of total input light power ratios for the respective optical amplifying means, making use of the measured result of the input power measuring means to control the gain equalizing characteristic of the variable gain equalizing means so that the measured values become equal to the target values, respectively.

According to the optical amplifier having such a constitution, the WDM signal light having a wider signal light band is sent via the variable gain equalizing means to the demultiplexing means and demultiplexed into a plurality of amplification-wavelength bands. The demultiplexed optical signals of the respective amplification-wavelength bands are amplified by the corresponding optical amplifying means, and then multiplexed by the multiplexing means. At this time, a part of the optical signals to be input into the respective optical amplifying means are sent to the input power measuring means, the total input-light power are monitored, and the gain equalizing characteristic of the variable gain equalizing means provided at the input stage is feedback controlled by the controlling means corresponding to the monitored results. In this case, the respective amplification-wavelength bands correspond to the measuring wavelength regions in the aforementioned monitoring method, and this monitoring method according to the present invention is realized by the operations of the channel information obtaining means, input power measuring means and controlling means, respectively. In this way, the tilt of light input into the respective optical amplifying means having different amplification-wavelength bands from each other can be assuredly compensated by utilizing the simple monitoring method. This constitution has two important points. The first point is that the tilt is compensated at the input side of the optical amplifying means to thereby relieve the noise figure of a channel wherein the transmission light power has been deteriorated, so that not only the tilt of the optical amplifier is compensated but also the wavelength characteristics of noise figures are suppressed, resulting in an advantage to the optical S/N ratio. The second point is that a common optical amplifier is already applied with a function for monitoring an input power so that a part of input light is branched and the thus branched light power is received by a photodiode. The monitoring method of the present invention utilizes such a constitution, so that no optical parts are required to be newly inserted.

Further objects, features and advantages of the present invention will become more apparent from the following description of preferred embodiments when read in conjunction with the accompanying drawings.

BRIEF DESCRIPTION OF THE DRAWINGS

FIG. 5 is a flowchart explaining the operation of the first embodiment;

FIG. 7 is a flowchart explaining the operation of the second embodiment;

FIG. 9 is a block diagram showing a concrete example of a light power measuring part according to a third embodiment of the present invention;

DETAILED DESCRIPTION OF THE PREFERRED EMBODIMENT

There will be described hereinafter the embodiments according the present invention, with reference to the accompanying drawings.

Figure 1:
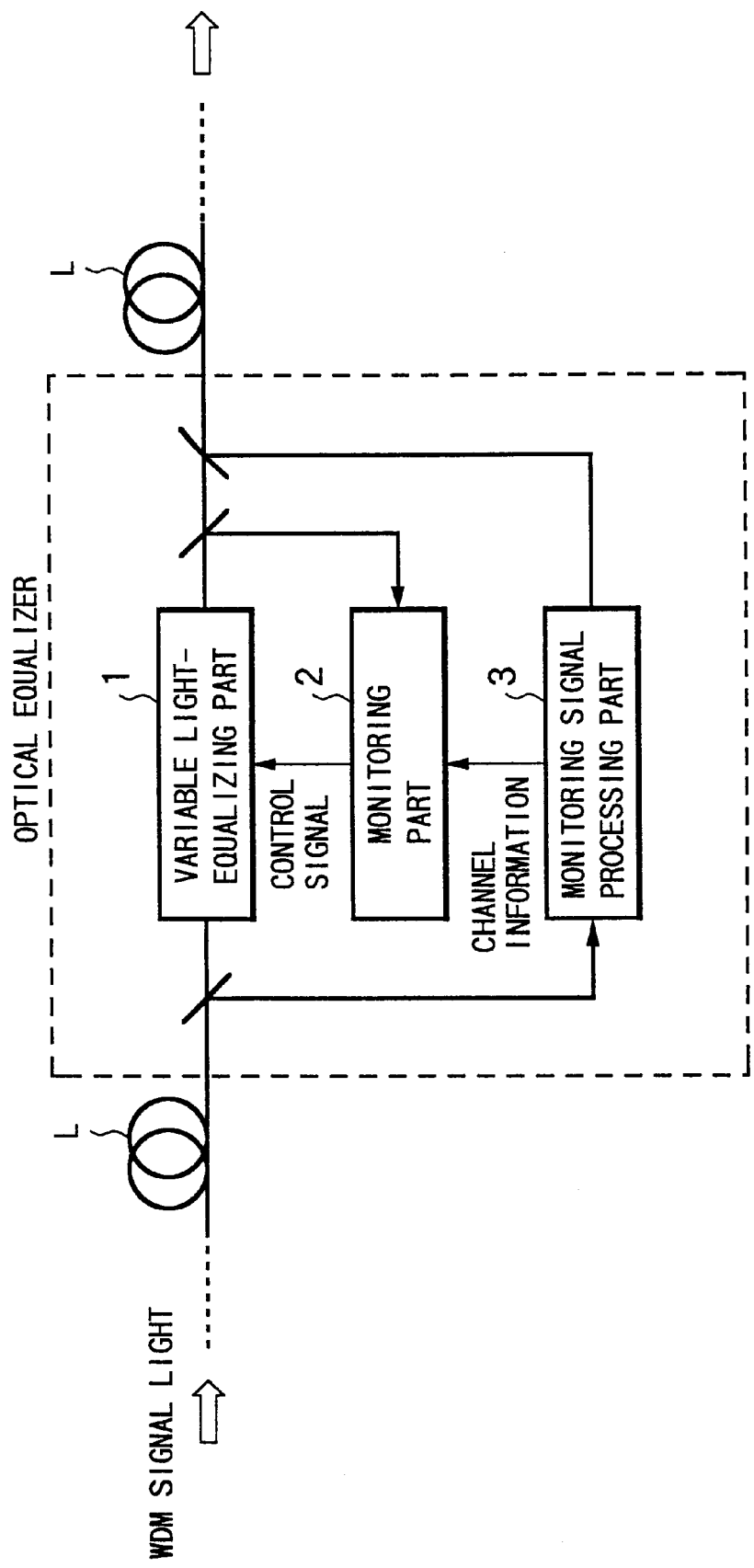
FIG. 1 is a block diagram showing a constitution of an optical equalizer according to a first embodiment of the present invention.

FIG. 1 is a block diagram showing a basic constitution of an optical equalizer as a first embodiment applied with a method according to the present invention for monitoring inter-wavelength light power deviations.

In FIG. 1, the present optical equalizer comprises a variable light-equalizing part 1 as variable light-equalizing means, a monitoring part 2, and a monitoring signal processing part 3 as channel information obtaining means.

The variable light-equalizing part 1 receives incoming main signal light (WDM signals light) propagated through an optical transmission path L, and outputs them after flattening deviations (tilt) of the input light power from the wavelength in accordance with a variable transmission (or optical filter) characteristic. As the variable light-equalizing part 1, there may be employed an optical filter having a variable wavelength transmission characteristic utilizing such as an acoustooptic effect or magneto-optical effect (see Japanese Patent Application No. 11-54374). It is also possible to employ a technique for compensating for the wavelength characteristics of light power by utilizing such as Raman amplification (see Japanese Patent Application No. 11-115971). The variable light-equalizing part 1 to be used in the present invention is not limited to the above constitutions, and any known type of optical equalizer can be adopted.

The monitoring part 2 branched a part of the respective WDM signal light output from the light-equalizing part 1, and measures the light power deviations by the monitoring method of the present invention, to control the characteristic of the variable light-equalizing part 1 based on the measured result.

The monitoring signal processing part 3 extracts channel information from monitoring signal light transmitted together with the WDM signal light, to transmit it to the monitoring part 2. This channel information indicates the information concerning the wavelength positions and bit rates (transmission rates) of respective channels included in the WDM signal light.

The constitution of the monitoring part 2 for realizing the monitoring method of the present invention will be described hereinafter in detail.

Figure 2:
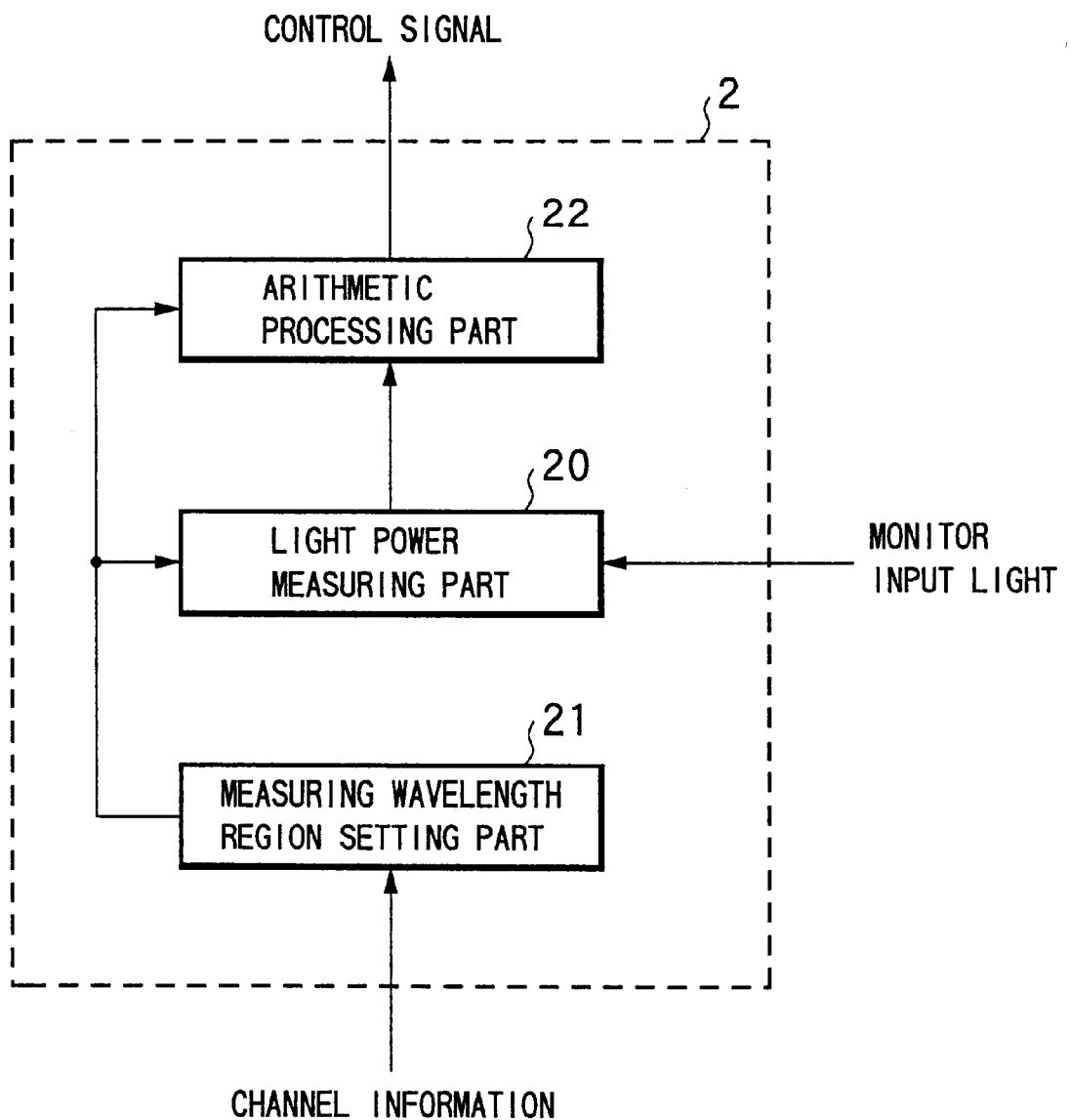
FIG. 2 is a block diagram showing a constitutional example of a monitoring part of the first embodiment.

FIG. 2 is a block diagram showing concretely a constitutional example of the monitoring part 2.

The monitoring part 2 shown in FIG. 2 includes, for example, a light power measuring part 20 as light power measuring means, a measuring wavelength region setting part 21 as measuring wavelength region setting means, and an arithmetic processing part 22 as controlling means.

The light power measuring part 20 measures a light power for the measuring wavelength region specified by an output signal from the measuring wavelength region setting part 21, by receiving, as monitor input light, a part of the WDM signal light to be input from the light-equalizing part 1 into the monitoring part 2, to output the measured result to the arithmetic processing part 22. As the concrete constitution of the light power measuring part 20, it is preferable to employ an optical system such as depicted in the FIG. 1 of a reference by K. Otsuka et al., "A High-Performance Optical Spectrum Monitor with High-Speed Measuring Time for WDM Optical Networks", ECOC '97, Vol. 2, pp. 147–150 (1997). The outline thereof will be briefly described hereinafter.

Figure 3:
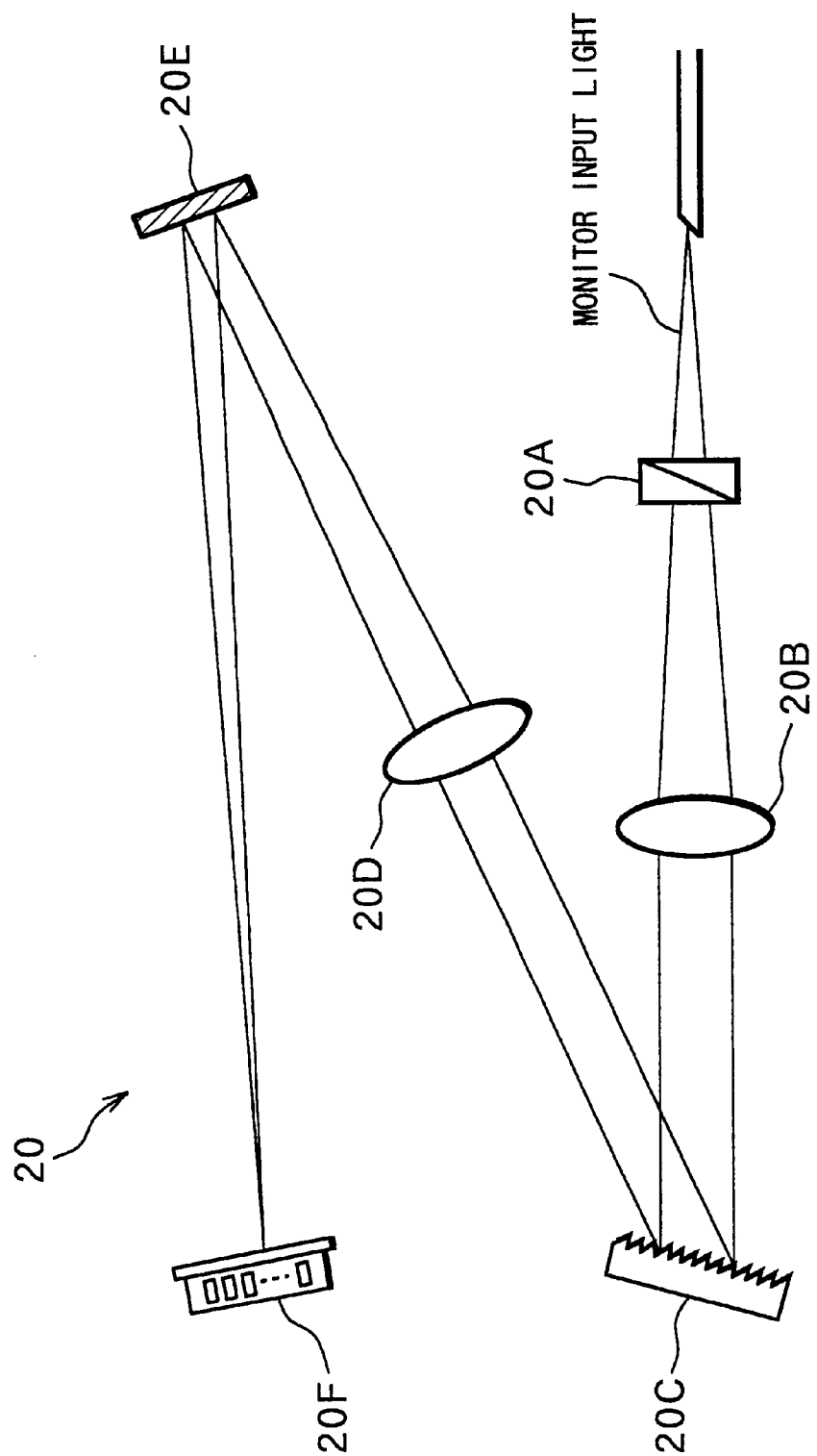
FIG. 3 is a view showing a concrete example of a light power measuring part of the first embodiment.

FIG. 3 is a view showing a concrete example of the light power measuring part 20 constituted by employing the optical system of the aforementioned reference.

The light power measuring part 20 shown in FIG. 3 comprises a polarization compensating plate 20A, a first lens 20B, a diffraction grating 20C, a second lens 20D, a planar mirror 20E and a PD array module (light receiving part) 20F, all of which are arranged in accordance with a so-called Czemy-Turner mounting manner. Concretely, the monitor input light emitted from one end of the input optical fiber is fed via the polarization compensating plate 20A and first lens 20B to the diffraction grating 20C to be diffracted. The diffracted light is then fed via the second lens 20D to the planar mirror 20E and reflected, and then received by the PD array module 20F.

The PD array module 20F includes a plurality of photodetectors (PD's) corresponding to the wavelengths of a plurality of channel light included in the monitor input light, and the light receiving faces of respective PD's are arranged at predetermined positions within a single plane. Herein, there will be shown such an example that 32 pieces of PD's are provided in the PD array module 20F and the respective PD's are arranged corresponding to the arriving positions of respective channel light diffracted corresponding to respective wavelengths, assuming that the main signal light includes optical signals of 32 channels at the maximum.

Figure 4:
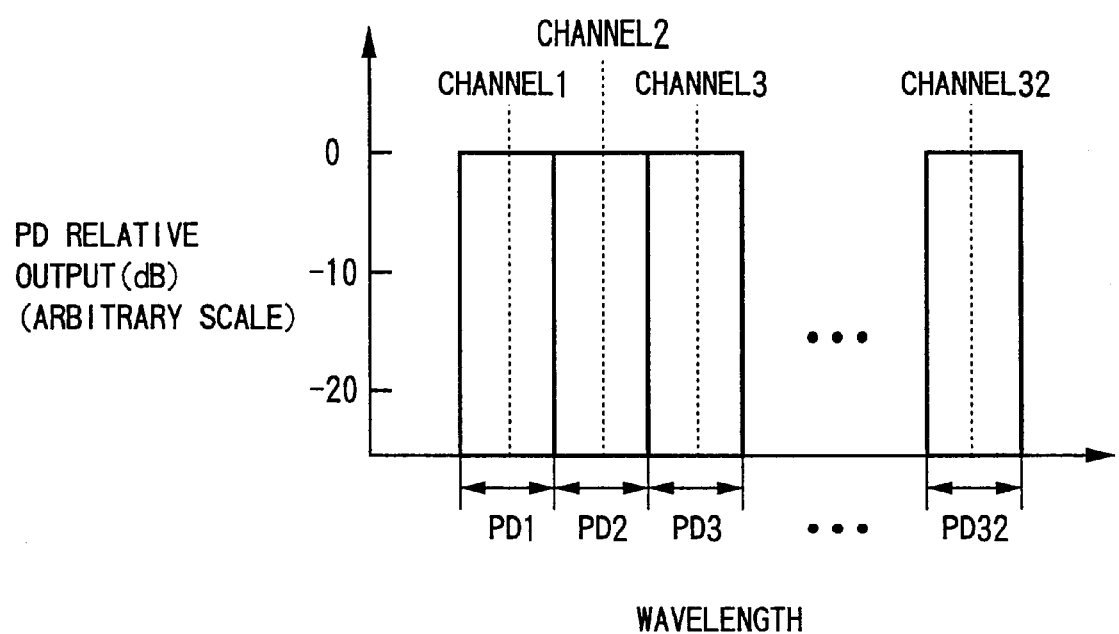
FIG. 4 is a view schematically showing relative output characteristics of respective PD's in a PD array module in the first embodiment.

FIG. 4 is a view schematically showing relative output characteristics of respective PD's corresponding to wavelengths.

As shown in FIG. 4, the 32 pieces of PD's, PD1 through PD32, respectively, generate output electric currents substantially equal to one another, for optical signals in certain wavelength ranges with the respective wavelengths of the channel 1 through channel 32 as the centers. It is noted that the aforementioned predetermined wavelength ranges are determined corresponding to the arrangement and the sizes of light receiving faces of respective PD's, and never correspond to the specific detectable wavelengths of PD's, respectively. Namely, the detectable wavelengths of PD's are required to include at least the wavelengths of corresponding channel light, respectively. Practically, it is possible to adopt the same PD's such that each of them has a detectable wavelength over the whole wavelength range of the optical signals of the 32 channels.

The diffraction grating 20C is of such as a holographic blazed type having a plurality of grooves of saw-toothed sections on its surface. The polarization compensating plate 20A is constituted of two pieces of birefringent wedges, so as to separate the monitor input light into mutually orthogonal two planes of linearly polarized light components. The provision of this polarization compensating plate 20A leads to the elimination of polarization dependency of the diffraction grating 20C. By such an optical system, the respective channel light included in the monitor input light are diffracted corresponding to the respective wavelengths and reach the predetermined positions of the PD array module 20F, to be converted into respective electric currents by the PD's corresponding to the wavelengths, respectively. There are selected only those of the output electric current values of the PD's which correspond to the wavelength ranges specified by the control signal from the measuring wavelength region setting part 21, and the selected values are sent to the arithmetic processing part 22.

Based on the channel information input into the monitoring part 2 from the monitoring signal processing part 3, the measuring wavelength region setting part 21 sets at least two wavelength ranges optimum for measuring light power, and sends a control signal for instructing the thus set measuring wavelength regions to the light power measuring part 20. The setting procedure of the measuring wavelength regions will be described later.

The arithmetic processing part 22 obtains a target value for the light power ratio concerning the measuring wavelength regions set corresponding to the control signal from the measuring wavelength region setting part 21, and calculates an actual light power ratio for the respective wavelength ranges making use of the output electric current values from the light power measuring part 20. Further, the arithmetic processing part 22 generates a control signal for adjusting the characteristics of the variable light-equalizing part 1 so that the measured value of the light power ratio becomes equal to the target value, and outputs this signal to the variable light-equalizing part 1.

There will be concretely described hereinafter the operation of the optical equalizer having the aforementioned constitution, with reference to FIG. 5.

In this optical equalizer, at step 101 (labeled as "S101" in the figure, and the same rule applies corresponding to the following steps) of the flowchart in FIG. 5 the channel information to be transmitted by the monitoring signal light is extracted at the monitoring signal processing part 3 and the thus extracted channel information is transmitted to the monitoring part 2. As a concrete example of the channel information herein, the following explanation is given by assuming that the numbers of the channels included in the WDM signal light propagated through the transmission path L are 1, 2, 3, 16, 17 and 32, and the bit rates of respective channel light are all 10 Gb/s. Note, the channels 1 through 32 are arranged in a so-called 1,550 nm band at predetermined wavelength intervals. It is further assumed that the light power required for respective channels are determined corresponding to the bit rates. Thus, when the bit rates of the respective channels are the same as described above, it is required to control the light power of all of the channels to become substantially equal to one another.

Upon completion of the extraction of the channel information, the flow advances to step 102 where the measuring wavelength regions suitable for measuring light power are set based on the channel information by the measuring wavelength region setting part 21 of the monitoring part 2. Here, it is assumed that two measuring wavelength regions A and B are assumed to be measured, for example. As the measuring wavelength region A, there is set a wavelength range of 1535.8-1537.4 nm including the channels 1, 2 and 3 at the shorter wavelength side. As the measuring wavelength region B, there is set a wavelength of 1560.6 nm including the channel 32 at the longer wavelength side. Further, the control signal representing the thus set measuring wavelength regions A and B is sent from the measuring wavelength region setting part 21 to the light power measuring part 20 and to the arithmetic processing part 22.

In setting the measuring wavelength regions, it is firstly notable to preferentially set a wavelength region (first measuring wavelength region) including the shortest wavelength channel among the used channels and a wavelength region (second measuring wavelength region) including the longest wavelength channel. This is because the dispersions of light power among respective channels tend to increase as the wavelength range becomes wider, so that further widening the wavelength interval between two wavelength ranges for light power monitoring enables improvement of measurement. Concretely, in the aforementioned example, setting a wavelength region (hereinafter called "wavelength region C") including the channels 16 and 17 at the middle of the 1,550 nm band instead of either of the measuring wavelength regions A and B may deteriorate the measuring precision. Contrary, setting three measuring wavelength regions A, B and C is regarded as improving the measuring precision rather than setting two measuring wavelength regions A and B. As described above, it is necessary in the present invention to set at least two measuring wavelength regions including the shortest and longest wavelength channels, respectively, corresponding to the channel information.

It is secondly notable to set wavelength ranges excluding noise light as less as possible. This is to avoid the occurrence of errors in the measurement of signal light power, such as due to amplified spontaneous emission light (noise light) having a wider band that is caused in an optical amplifier applied to the system adopting the present optical equalizer. Concretely, in the above example, setting the measuring wavelength region A to only the wavelength ranges including the used neighboring channels 1, 2 and 3 enables the reduction of affection of noise light, rather than widening the measuring wavelength region up to unused channels (such as channels 4 and 5). Note, why the measuring wavelength region A includes not only the channel 1 of the shortest wavelength but also the channels 2 and 3 is that the inclusion of more of used neighboring channels enables the improvement of measuring precision of signal light power.

When the two measuring wavelength regions set at step 102 are within a wavelength band narrower than a previously set width of wavelength band, or when the settable measuring wavelength region exists in only one, the control by the variable light-equalizing part 1 may be stopped without conducting the process at step 103 and so forth. This is because, it can be judged that the wavelength difference between the used channels is small so that the dispersions of light power caused among respective channels are also small, therefore it is unnecessary to equalize such small dispersions of light power. This enables the effective control of the optical equalizer.

At step 103, there is obtained a target value of light power ratio for the measuring wavelength regions A and B by the arithmetic processing part 22. In this case, the target value of the light power ratio can be obtained corresponding to the numbers of channels included in the respective measuring wavelength regions A and B, since it is enough to control such that all of the bit rates of the respective channels become the same and all of the light power of the respective channels have the same value. Namely, since the number of channels included in the measuring wavelength region A is 3, and that of the range B is 1, the light power ratio as the target value becomes A:B=3:1 (A/B=3).

After completion of the calculation of the target value or parallelly to such a calculation, output electric current values of PD's corresponding to the measuring wavelength regions A and B are read, respectively, at step 104. Concretely, the light power measuring part 20, which has received the control signal from the measuring wavelength region setting part 21, outputs to the arithmetic processing part 22 the output electric current values of PD1 through PD3 corresponding to the channel 1 through channel 3 for the measuring wavelength region A, respectively, as well as the output electric current value of the PD32 corresponding to the channel 32 for the measuring wavelength region B. For example, it is assumed here that the output electric current values of PD1, PD2, PD3 and PD32 are 0.5 mA, 0.6 mA, 0.7 mA and 1.0 mA, respectively.

At step 105, there is obtained a measured value of the light power ratio for the measuring wavelength regions A and B at the arithmetic processing part 22 which has received the monitored values from the light power measuring part 20. The calculation of this measured value is performed by adding the output electric current values of the respective PD's corresponding to the respective measuring wavelength regions, and by obtaining the ratio between the added values. In the case that the aforementioned output electric current values are obtained for the respective PD's, the added value of the output electric currents for the PD1 through PD3 becomes 1.8 mA for the measuring wavelength region A, and the output electric current value of the PD32 is 1.0 mA for the measuring wavelength region B. Thus, the light power ratio as a measured value becomes A:B=1.8:1 (A/B=1.8).

Upon completion of the calculation of the measured value, the flow advances to step 106 where the arithmetic processing part 22 generates a control signal for adjusting the characteristic of the variable light-equalizing part 1 such that the measured value of the light power ratio for the measuring wavelength regions A and B becomes equal to the target value obtained at step 103. This control signal is sent to the variable light-equalizing part 1. In this way, those light power deviations among respective channels caused in such as the transmission path L can be assuredly equalized by the optical equalizer according to the present invention.

According to the first embodiment as described above, at least two measuring wavelength regions suitable for measuring light power are set based on the channel information, so as to monitor the light power deviations among respective channels included in the WDM signal light. Thus, it becomes possible to monitor the tilt with higher precision while directly measuring the signal light power at a relatively low resolution of wavelength, thereby enabling the provision of the optical equalizer provided with the monitoring part 2 having a simple and economical constitution.

There will be described hereinafter an optical equalizer according to a second embodiment of the present invention.

In this second embodiment, it is intended to downsize the light power measuring part 20 of the optical equalizer of the first embodiment, by simplifying the constitution of the part 20. Concretely, whereas in the first embodiment the PD array module 20F of the light power measuring part 20 is provided with 32 pieces of PD's corresponding to the respective wavelengths of signal light of 32 channels, in this second embodiment the intervals between the wavelengths to be detected by individual PD's are set to be coarser than those of respective channels so that the PD array module includes PD's less than the number of channels.

Figure 6:
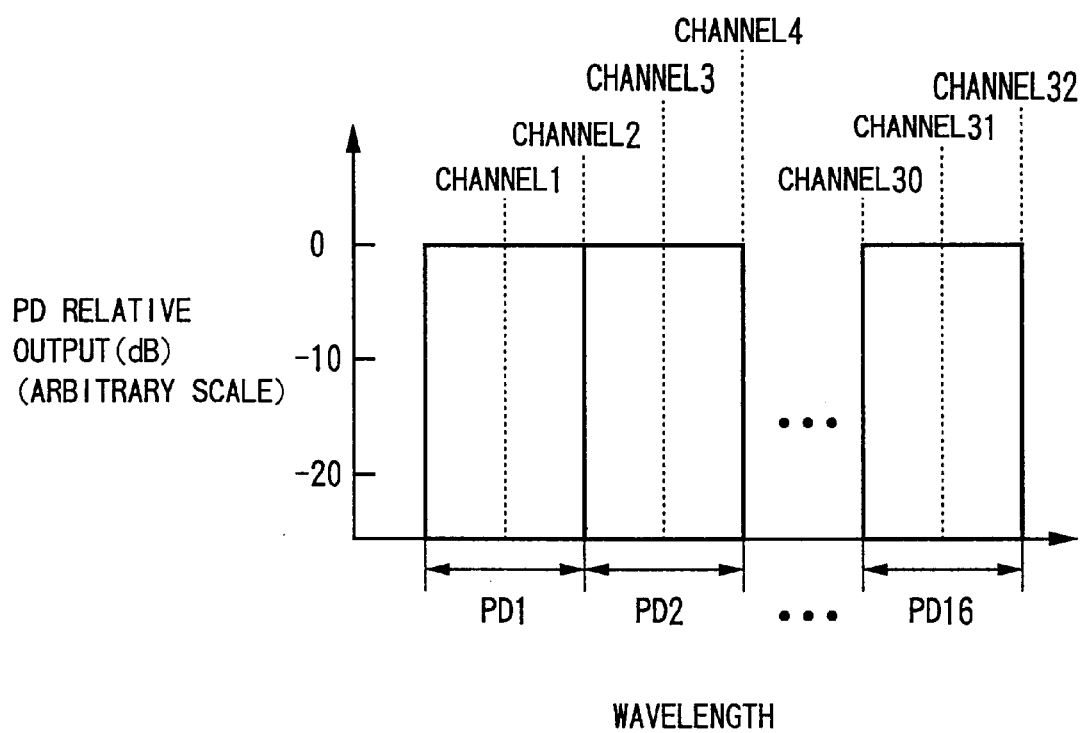
FIG. 6 is a view schematically showing relative output characteristics of respective PD's in a PD array module in a second embodiment of the present invention.

FIG. 6 is a view schematically showing relative output characteristics of respective PD's corresponding to wavelengths, concerning the PD array module to be used in the second embodiment. The constitution of a light power measuring part to be constituted making use of this PD array module is identical with that of FIG. 3.

As shown in FIG. 6, the PD array module to be used in the second embodiment is provided with 16 pieces of PD's, i.e., PD1 through PD16, for example, corresponding to signal light of 32 channels. In this case, the PD1 through PD16 are arranged at predetermined positions such that the light receiving faces of the PD's continue along the diffracted direction of the monitor input light, and the diffracted signal light of the odd-numbered channels reach the center portions of the light receiving faces of the respective PD's, and the diffracted signal light of the even-numbered channels reach the boundary portions between neighboring PD's. According to such an arrangement, for example, the signal light of channels 1 and 2 are received by the PD1, the signal light of channels 2, 3 and 4 are received by the PD2, and so forth, and the signal light of channels 30, 31 and 32 are received by the PD16.

There will be described hereinafter the operation of the optical equalizer applied with the PD array module as noted above with reference to FIG. 7.

In FIG. 7, the flowchart showing the basic operation of the present optical equalizer is identical with that in FIG. 5, except that different operations are performed for the calculation procedure of a target value at step 103, for PD's from which output electric current values are read at step 104, and for the calculation procedure of a measured value at step 105 in this concrete example, as result of the reduction of the number of PD's included in the PD array module.

Namely, in case of obtaining a target value at step 103 based on the same setting of the concrete example with the first embodiment, although the number of channels included in the measuring wavelength region A is 3, the channel 2 is received by both of the PD1 and PD2, and substantially identical outputs are generated in the PD1 and PD2 as shown in FIG. 6. Thus, the target value of the light power ratio between the measuring wavelength regions A and B becomes A:B=4:1 (A/B=4).

At step 104, the respective output electric current values of the PD1, PD2 and PD16 are read out corresponding to the measuring wavelength regions A and B. For example, it is assumed here that the output electric current values of PD1, PD2, and PD16 are read to be 0.5 mA, 0.6 mA, and 1.0 mA, respectively.

At step 105, there is obtained a measured value of the light power ratio for the respective measuring wavelength regions A and B. In this case, the added value of the output electric currents of the PD's 1 and 2 for the measuring wavelength region A becomes 1.1 mA, and the output electric current value of the PD16 for the measuring wavelength region B is 1.0 mA. Thus, the measured value of the light power ratio becomes A:B=1.1:1 (A/B=1.1). Further, the variable light-equalizing part 1 is controlled at step 106 so that the measured value becomes equal to the target value (A/B=4).

According to the second embodiment as described above, there can be obtained the same effect with the first embodiment, even by providing PD's the number of which is less than the maximum number of channels included in the WDM signal light, as the constitution of the PD array module of the light power measuring part 20. Thus, the constitution of the monitoring part 2 is further simplified, thereby enabling further downsizing and economizing of the optical equalizer.

In the second embodiment, there has been described a situation where 16 pieces of PD's are provided for 32 channels of WDM signal light. However, the present invention is not limited thereto, and the number of PD's can be further reduced applicably in accordance with the above concept. Namely, although it depends on such as precision required for tilt monitoring, it is ultimately possible to obtain the effect of the present invention even by providing only two pieces of PD's at the shorter and longer wavelength sides, respectively.

Figure 8A:
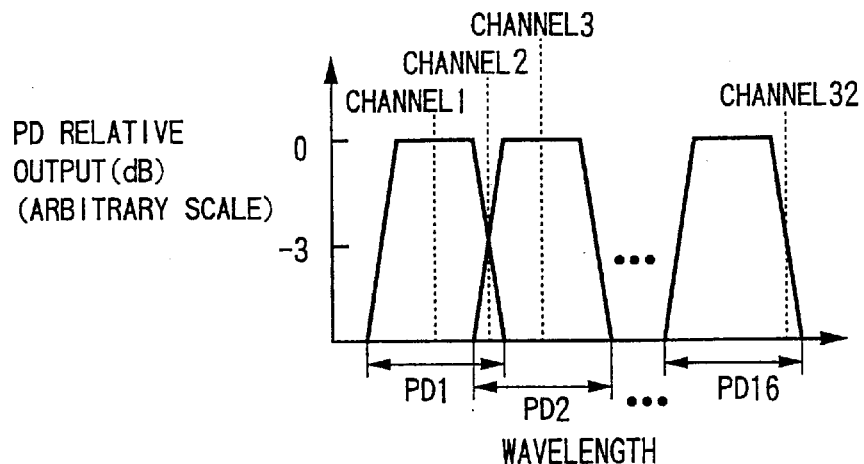
FIG. 8 is a view schematically showing relative output characteristics of respective PD's in a PD array module having another constitution concerning the second embodiment.

FIG. 6 has shown the situation where 16 pieces of PD's are provided such that relative outputs of PD's for respective channels become substantially the same. For example, as shown in FIG. 8(A), it is also possible to arrange such that the relative outputs of PD's for the odd-numbered channels become 0 dB, respectively, and the relative outputs of the even-numbered channels become −3 dB, respectively. In this case, the target value of the light power ratio for a concrete example identical with the above may be calculated as follows. The values of −3 dB of the relative outputs for the even-numbered channels mean that the light power of the even-numbered channels to be received by respective PD's are ½ of those of the odd-numbered channels. As such, for the measuring wavelength region A, the PD1 has output values of 1 and 0.5 for the channels 1 and 2, respectively, and the PD2 has output values of 0.5 and 1 for the channels 2 and 3, respectively. Meanwhile, concerning the measuring wavelength region B, the PD16 has an output value of 0.5 for the channel 16. As a result, the target value of the light power ratio becomes A:B=(1+0.5+0.5+1):0.5=3:0.5=6:1.

Figure 8B:
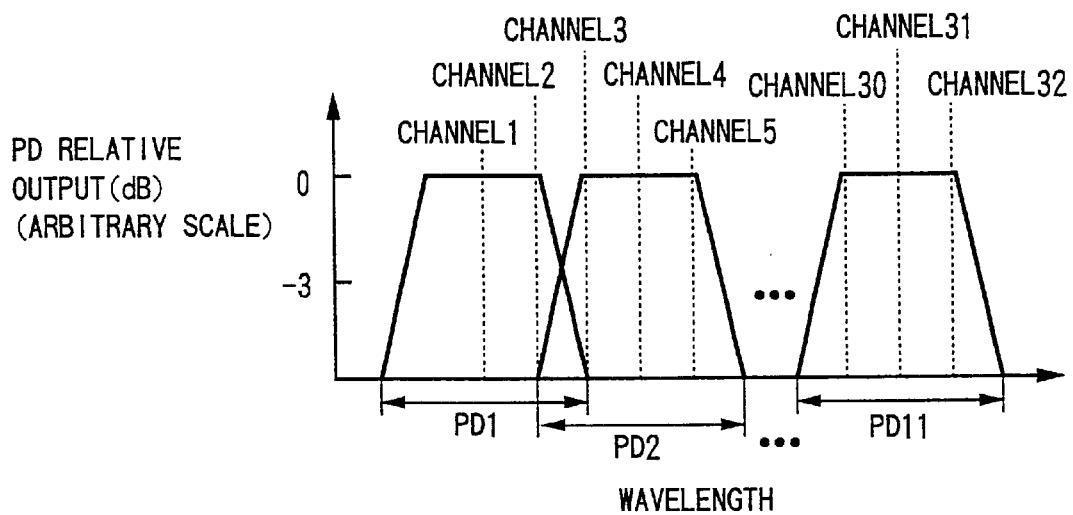

Moreover, it is even possible to constitute the PD array module using PD's the number of which is less than the situation shown in FIG. 8(A). FIG. 8(B) shows an example thereof.

FIG. 8(B) shows a constitution that PD's having light receiving sensitivities in wider wavelength ranges are adopted such that each PD receives a plurality of signal light, and these signal light are received at a point thereof where the light receiving sensitivity of each PD becomes maximum. In this case, each PD is required to have its light receiving band where the light receiving sensitivity of each PD becomes maximum (for example, 1.6 nm width or more) wider than the wavelength interval (such as 0.8 nm) of signal light. In case of the aforementioned PD array module, upon receiving the channel information representing that the used channel numbers are 3, 4, 6, 7 and 9, for example, there are selected the PD2 at the shorter wavelength side for receiving the channels 3 and 4, and the PD4 at the longer wavelength side for receiving the channel 9, and the respective electric current values from these PD's are read out. Supposing that both of the electric current values of PD2 and PD4 are 0.5 mA, there are obtained the values by dividing the electric current values by the number of signals, respectively. Namely, there are obtained 0.5 mA/2 for the PD2 and 0.5 mA/1 for the PD4, respectively, and the variable light-equalizing part is adjusted so that both values become the same.

Figure 8C:
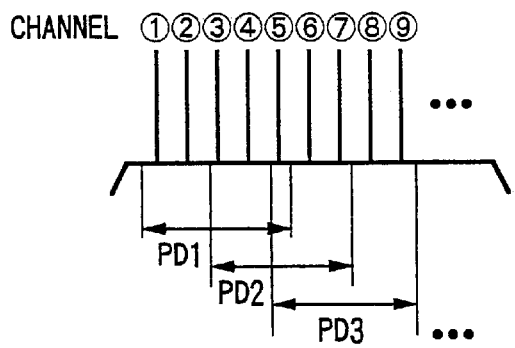

In addition to the above, it is also possible that the ranges of signal light to be received by respective PD's are arranged so that the neighboring PD's overlap with one another as shown in FIG. 8(C). Namely, it is enough for each measuring wavelength region to include at least one distinctive channel light. In case of FIG. 8(C), the channels 3, 4 and 5 are included in both of PD1 and PD2.

There will be described hereinafter an optical equalizer according to a third embodiment of the present invention.

FIG. 9 is a block diagram showing a constitution of a light power measuring part applied to the third embodiment. Note, the remaining constitution of the optical equalizer except for the light power measuring part is identical with that of the first embodiment shown in FIGS. 1 and 2.

In FIG. 9, the light power measuring part 20' adopted in the present optical equalizer includes a tunable optical filter 20G as a variable optical filter, a photodiode (PD) 20H as a light receiving part, and a data storing part 201 as a selecting part.

The tunable optical filter 20G is a known type optical filter the wavelength transmission characteristic of which can be varied by a signal (not shown) from the outside. This filter 20G receives monitor input light as a result of branching a part of WDM signal light output from the light-equalizing part 1. The wavelength transmission characteristic of this tunable optical filter 20G is controlled such that its transmission central wavelength is shifted in a timewise manner over the wavelength range including the measuring wavelength regions to be set by the measuring wavelength region setting part 21. The PD 20H is a photodetector for converting the optical signal passed through the tunable optical filter 20G into an electric current, and for outputting it. It is supposed here that a single photodetector is used which has a wider detectable wavelength band covering the wavelength band of the WDM signal light. The data storing part 201 stores the electric current value output from the PD 20H, corresponding to the transmission central wavelength of the tunable optical filter 20G at that time. Here, the data storing part 201 stores only those data corresponding to the measuring wavelength regions according to the control signal output from the measuring wavelength region setting part 21, and outputs the thus stored data to the arithmetic processing part 22.

There will be described hereinafter the operation of the optical equalizer applied with the aforementioned light power measuring part 20', with reference to FIG. 10.

Figure 10:
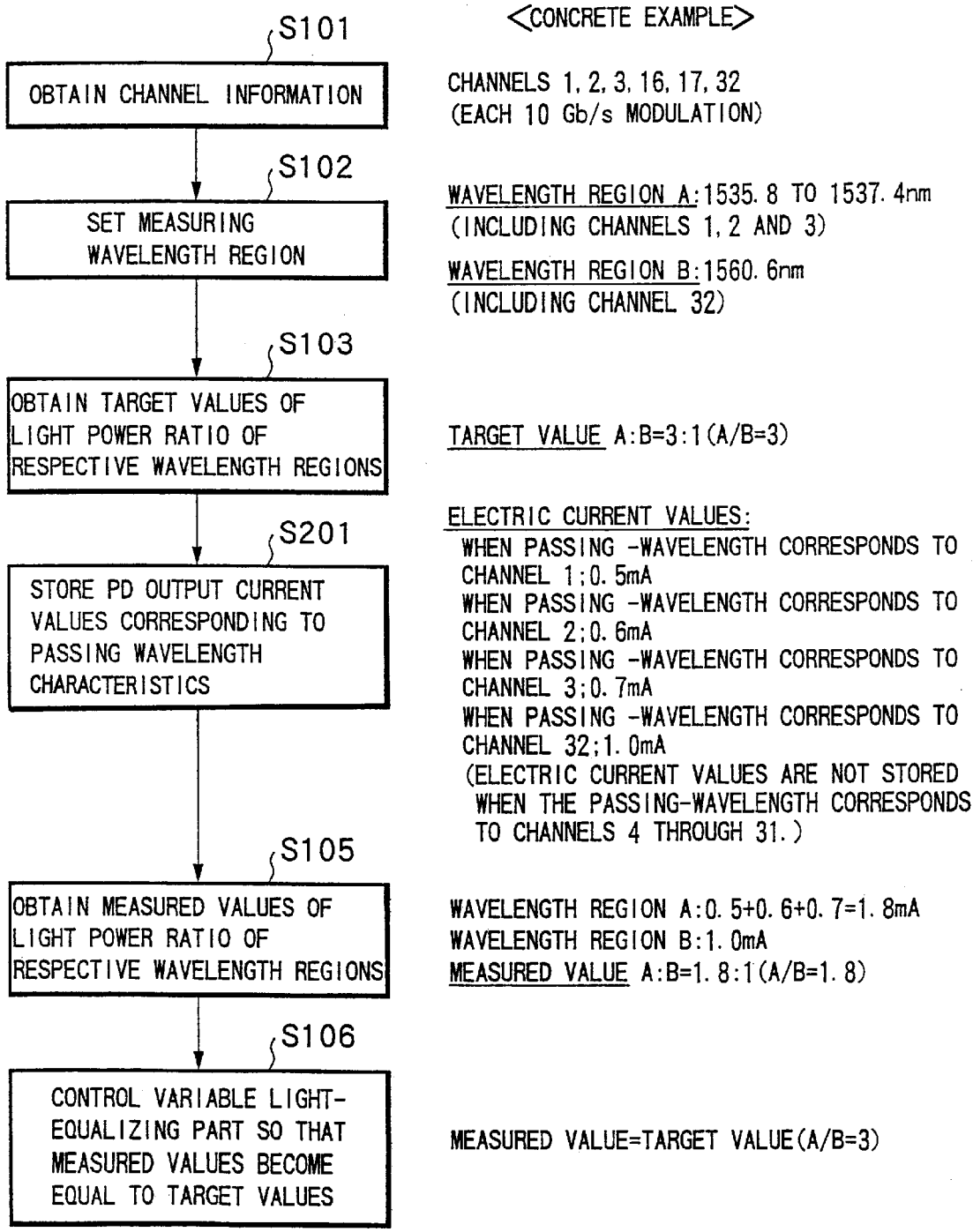
FIG. 10 is a flowchart explaining the operation of the third embodiment.

In FIG. 10, the processes at step 101 through step 103 are identical with those in the first embodiment, so that the explanation thereof is omitted. Upon completion of the calculation of the target value at step 103, the flow advances to step 201.

At step 201, the output electric current values of the PD 20H are stored into the data storing part 201 in the light power measuring part 20', corresponding to the wavelength transmission characteristic of the tunable optical filter 20G. At this time, the data storing part 201 stores only those electric current values which correspond to the channels 1, 2, 3 and 32 included in the measuring wavelength regions A and B as specified by the control signal from the measuring wavelength region setting part 21. Those electric current values corresponding to other channels 4 through 31 are not stored. It is assumed here that those output electric current values of the PD 20H are 0.5 mA, 0.6 mA, 0.7 mA and 1.0 mA when the transmission central wavelength of the tunable optical filter 20G coincides with the wavelengths of the channels 1, 2, 3 and 32, respectively. These electric current values are stored into the data storing part 201 and also sent to the arithmetic processing part 22.

At step 105, the measured value of the light power ratio for the measuring wavelength regions A and B is obtained to be A:B=1.8:1 by the arithmetic processing part 22 in the same manner with the first embodiment. At step 106, the variable light-equalizing part 1 is controlled so that the measured value becomes equal to the target value.

According to the third embodiment, there can be obtained the same effect with that of the first embodiment, even by constituting the light power measuring part 20' making use of the tunable optical filter 20G, PD 20H and data storing part 20I. Further, the half-width of the wavelength transmission characteristic of the tunable optical filter 20G depends on the wavelength resolution to be monitored. However, in the monitoring method according to the present invention in which the light power are measured by setting suitable wavelength regions, the light power can be precisely monitored even with a relatively lower wavelength resolution, to thereby omit the necessity of a high-graded optical filter characteristic having a narrower half-width, resulting in an advantageous cost performance. Concretely, the monitoring method according to the present invention enables the utilization of the tunable optical filter 20G provided with its wavelength transmission characteristic having a wider half-width such as on the order of 5 nm, even in a system having narrower wavelength intervals of 1 nm between respective channels.

The first through third embodiments have shown a case where all of the bit rates of the respective channels are controlled to become the same and all of the light power of the respective channels are controlled to have the same value. However, the present invention can be also applied to such a situation where the bit rates of respective channels are different from one another. In such a situation, the target value of the light power ratio is to be calculated in view of those differences among target output levels of light power of respective channels, since the target output levels are determined corresponding to bit rates of respective channels. Concretely, for example, when target output levels of channels having bit rates of 10 Gb/s and 2.5 Gb/s are 7 dBm/ch and 4 dBm/ch, respectively, the calculation is conducted such that the channel light power of the 2.5 Gb/s bit rate channel becomes ½ times (i.e., half) of that of the 10 Gb/s bit rate channel.

There will be described hereinafter an optical amplifier applied with the method for monitoring inter-wavelength light power deviations according to the present invention.

Figure 11:
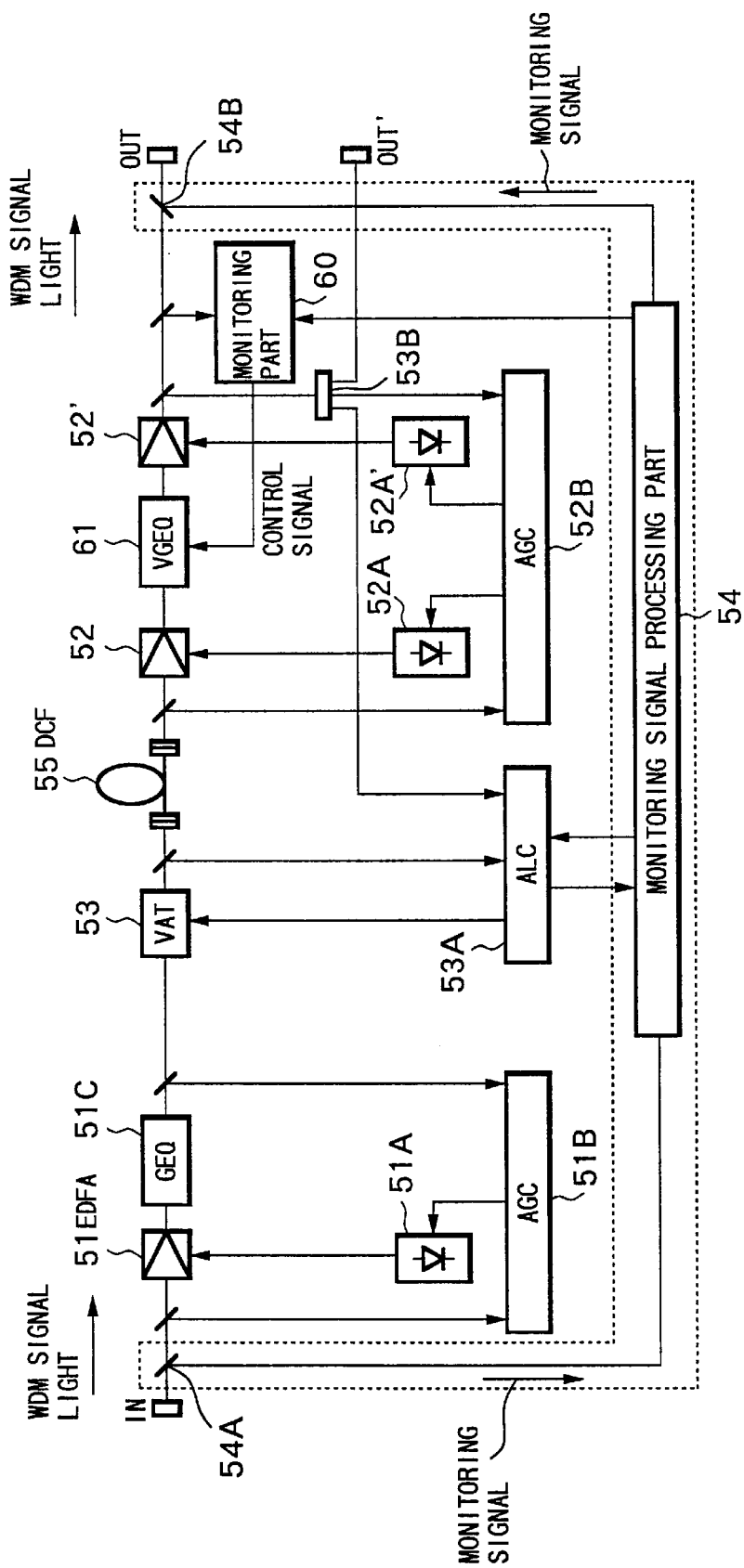
FIG. 11 is a block diagram showing a constitution of an optical amplifier according to a fourth embodiment of the present invention.

FIG. 11 is a block diagram showing a constitution of an optical amplifier according to a fourth embodiment of the present invention.

In FIG. 11, this optical amplifier is provided by applying anyone of the optical equalizers shown in the first through third embodiments to a known optical amplifier. For example, in a known constitution of an optical amplifier including a variable optical attenuator (VAT) arranged between substantially two-staged optical amplifying parts, there are provided a monitoring part 60 applied with the monitoring method according to the present invention, and a variable gain equalizer (VGEQ) 61 to be controlled in response to the monitored result of the monitoring part 60.

The two-staged optical amplifying parts utilize such as erbium doped optical fiber amplifiers (EDFA's), and it is supposed here that the optical amplifying part of a preceding stage has one EDFA 51 and the optical amplifying part of a succeeding stage has two series connected two EDFA's 52, 52'. Although the optical amplifying part of the succeeding stage is constituted of two-stages of EDFA's 52, 52', these EDFA's can be substantially regarded as being a single EDFA, since the optical amplifying part of the succeeding stage is constituted in a two-staged manner simply to realize high-powerization of the optical amplifier.

The EDFA's 51, 52 and 52' collectively amplify the signal light of respective wavelengths by introducing and transmitting the WDM signal light at a 1,550 nm band into and through erbium doped fiber which has been brought into excited state by receiving exciting light from exciting light sources 51A, 52A and 52A'. The wavelength of the exciting light of each EDFA's may be at a 980 nm band or 1,480 nm band, for example.

The optical amplifying parts of the preceding and succeeding stages are provided with AGC circuits 51B, 52B, respectively. Each of the AGC circuits 51B. 52B monitors the respective power of input light and output light of the associated optical amplifying part, and automatically controls the power of exciting light such that the gain at the associated optical amplifying part becomes a predetermined value.

There is further provided a gain equalizer (GEQ) 51C at the output side of the EDFA 51 of the preceding stage. This gain equalizer 51C has a fixed gain equalizing characteristic corresponding to the gain wavelength characteristic of the EDFA 51, and compensates the tilt of the light power generated at the EDFA 51. There is further provided a variable gain equalizer (VGEQ) 61 as variable gain equalizing means, between the EDFA's 52, 52' at the succeeding stage side. This variable gain equalizer 61 has a variable gain equalizing characteristic for compensating the tilt of the WDM signal light in response to the monitored result of the monitoring part 60, and possesses the same function with the variable light-equalizing part 1 in the first through third embodiments. It is assumed here that the variable gain equalizer 61 has a basic gain equalizing characteristic designed corresponding to the respective gain wavelength characteristics of the EDFA's 52, 52', and this gain equalizing characteristic is designed to be variable corresponding to the linear fluctuation of the tilt caused by the loss wavelength characteristics such as of optical transmission paths connected to the present optical amplifier.

The monitoring part 60 receives a part of the output light from the EDFA 52', measures light power for the measuring wavelength regions according to the channel information from a monitoring signal processing part 54 to be described later to thereby obtain the light power deviations of monitor light, and generates a control signal for adjusting the gain equalizing characteristic of the variable gain equalizer 61 corresponding to the obtained result. This monitoring part 60 is identical with the monitoring part 2 in the first through third embodiments. The arrangement of the monitoring part 60 and variable gain equalizer 61 is not limited to the aforementioned positions, and these parts 60 and 61 can be provided at suitable positions in response to the requirements such as for a noise characteristic and an output light power of the present optical amplifier, in view of such as the insertion loss of the variable gain equalizer 61.

There is provided a variable optical attenuator (VAT) 53 between the optical amplifying parts of the preceding and succeeding stages. This variable optical attenuator 53 is a known type capable of varying an optical attenuation amount based on a signal from the outside. The optical attenuation amount of this variable optical attenuator 53 is controlled by a signal output from an ALC circuit 53A. Based on the optical signal as a result of branching a part of the output light of the variable optical attenuator 53 and the optical signal partially as a result of branching a part of the output light of the EDFA 52' which is transmitted via an optical coupler 53B, this ALC circuit 53A generates a signal for controlling the optical attenuation amount of the variable optical attenuator 53 such that the output light power per one wavelength of the present optical amplifier has a constant level. The optical signals branched by the optical coupler 53B are sent to the AGC circuit 52B, and also to the outside via an output monitoring port OUT.

The present optical amplifier further includes the monitoring signal processing part 54 for processing the monitoring signal (i.e., supervising signal) included in the incoming WDM signal light. This monitoring signal processing part 54 receives the monitoring signal light demultiplexed from the WDM signal light by a WDM coupler 54A inserted between an input port IN and the optical amplifying part of the preceding stage. This part 54 has the same function with the monitoring signal processing part 3 in the first through third embodiments. Here, the obtained channel information is sent to the monitoring part 60 and ALC circuit 53A. Further, the monitoring signal light input into the monitoring signal processing part 54 is multiplexed into the WDM signal light via a WDM coupler 54B inserted between the optical amplifying part at the succeeding stage and an output port OUT.

Further, here, there is connected between the variable optical attenuator 53 and the EDFA 52 a dispersion compensating fiber (DCF) 55 for compensating for wavelength dispersion caused such as in an optical transmission path connected to the present optical amplifier. This fiber 55 may be provided according to the necessity of the compensation of dispersion.

The operation of the optical amplifier having the aforementioned constitution will be described hereinafter.

In the present optical amplifier, the WDM signal light input into the input port IN is sent to the EDFA 51 and a part thereof is branched to be sent to the AGC circuit 51B. Further, the monitoring signal light included in the input light is demultiplexed by the WDM coupler 54A and then transmitted to the monitoring signal processing part 54.

At the EDFA 51, the signal light of respective wavelengths are collectively amplified by receiving the exciting light supplied from the exciting light source 51A. The output light from the EDFA 51 is sent to the EDFA 52 at the succeeding stage via the gain equalizer 51C, variable optical attenuator 53 and dispersion compensating fiber 55, and a part of the output light from the gain equalizer 51C is branched to be sent to the AGC circuit 51B. At this AGC circuit 51B, the input light power into the EDFA 51 and the output light power from the EDFA 51 are monitored, and the operation of the exciting light source 51A is controlled such that the EDFA 51 operates at a fixed gain.

At the monitoring signal processing part 54 as channel information obtaining means, there is discriminated the channel information concerning the WDM signal light input into the present optical amplifier, based on the monitoring signal light demultiplexed at the WDM coupler 54A. The discriminated channel information is passed to the monitoring part 60, and the number of channels of the WDM signal light is passed to the ALC circuit 53A.

The WDM signal light transmitted to the EDFA 52 is collectively amplified under the control of the AGC circuit 52B, then gain equalized at the variable gain equalizer 61, further sent to the EDFA 52', and collectively amplified under the control of the AGC circuit 52B. The gain equalizing characteristic of the variable gain equalizer 61 at this time is controlled in accordance with the control signal output from the monitoring part 60, and this controlling operation for the gain equalizing characteristic is identical with that of the variable light-equalizing part 1 in the aforementioned embodiments. Namely, similarly to the monitoring method such as shown in FIG. 5, the target value and measured value of the light power ratio for respective measuring wavelength regions are obtained by the monitoring part 60, and the gain equalizing characteristic of the variable gain equalizer 61 is controlled so that the measured value becomes equal to the target value.

Further, in the present optical amplifier, a part of the output light from the EDFA 52' and a part of the output light from the variable optical attenuator 53 are branched and sent to the ALC circuit 53A, and the optical attenuation amount of the variable optical attenuator 53 is controlled by this ALC circuit 53A. In this way, the WDM signal light in which the output light power per one wavelength is controlled to be constant is output to the outside via the output port OUT,.

According to the fourth embodiment as described above, by providing the monitoring part 60 and the variable gain equalizer 61, to which the monitoring method according to the present invention is applied, within the optical amplifier, it becomes possible to monitor the tilt with higher precision while directly measuring the signal light power by the monitoring part 60 having a simple constitution not requiring a higher wavelength resolution. This enables the provision of a downsized and economical optical amplifier having a tilt compensating function.

Figure 12:
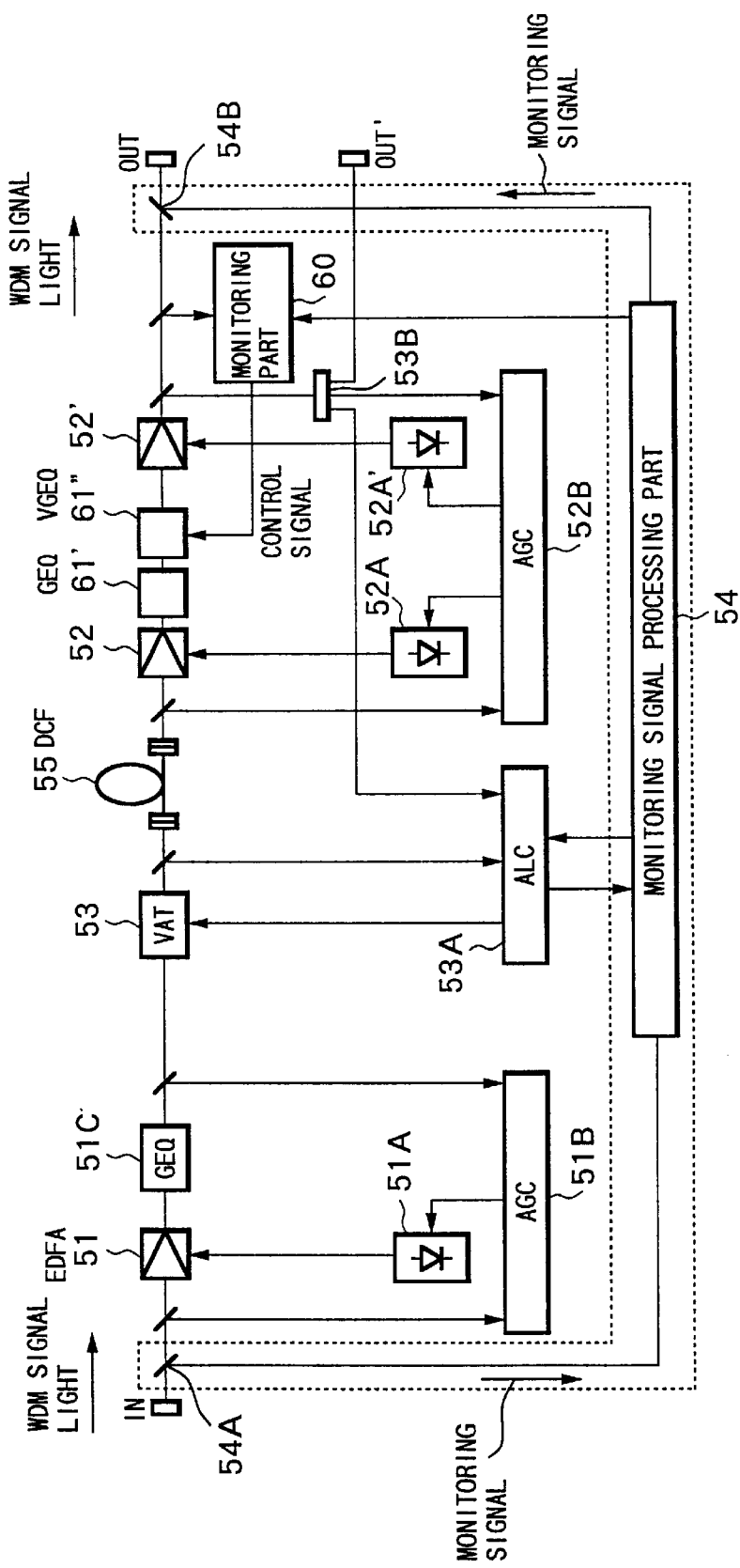
FIG. 12 is a block diagram showing a constitution of a combination of fixed and variable gain equalizers concerning the fourth embodiment.

In the fourth embodiment, the description has been conducted by assuming that the variable gain equalizer 61 has a gain equalizing characteristic corresponding to the tilt caused such as at the optical amplifying part of the succeeding stage and the optical transmission paths. However, when it is difficult to realize such a variable gain equalizing characteristic by a single optical equalizer, it is possible to combine a gain equalizer (GEQ) 61' having a fixed gain equalizing characteristic with a variable gain equalizer (VGEQ) 61", as shown in FIG. 12. In this case, the gain equalizing characteristic of the fixed gain equalizer 61' can be designed corresponding to the complicated gain wavelength characteristics of the EDFA's 52, 52', while the gain equalizing characteristic of the variable gain equalizer 61" can be designed corresponding to the linear tilt caused such as in optical transmission paths.

There will be described hereinafter an optical amplifier according to a fifth embodiment of the present invention.

Figure 13:
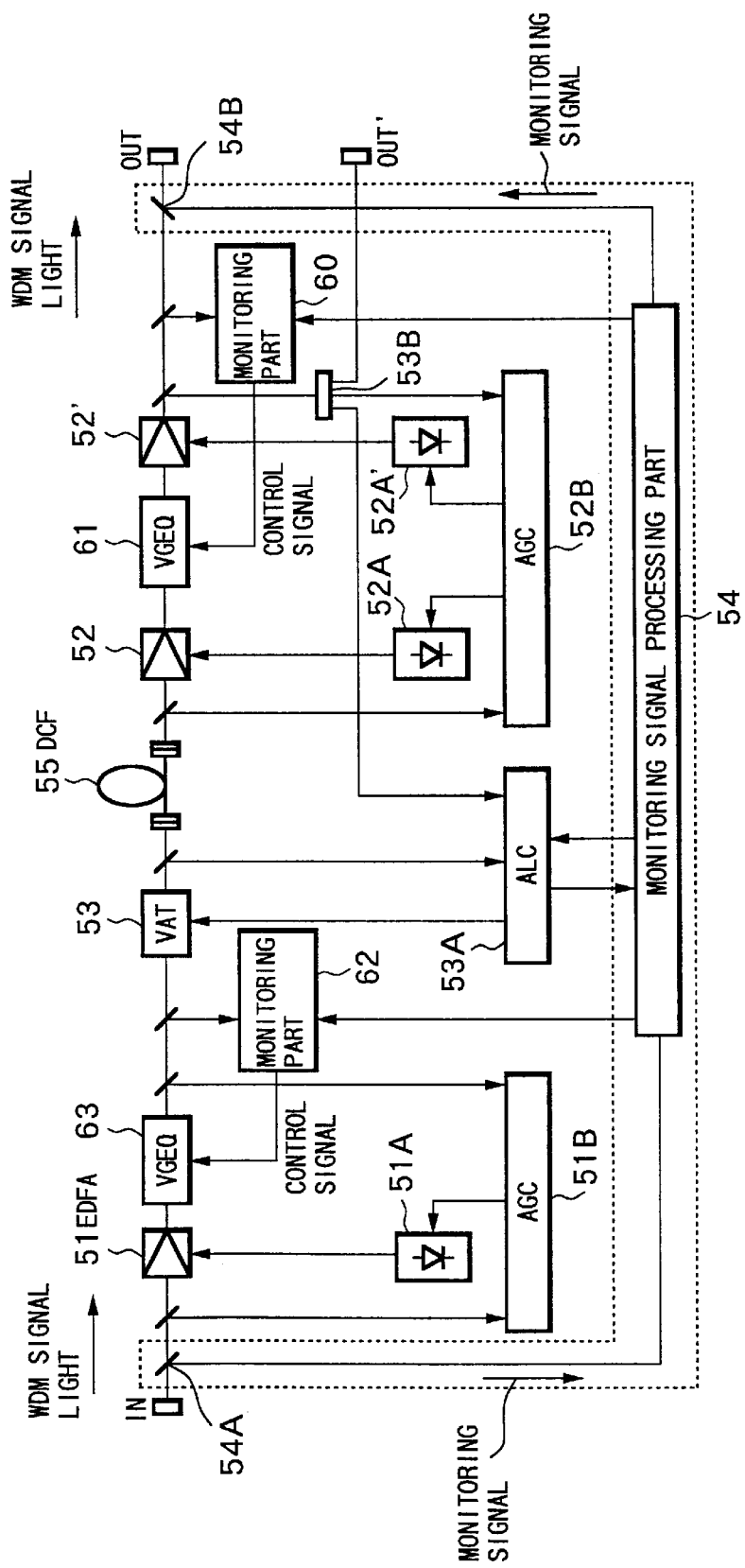
FIG. 13 is a block diagram showing a constitution of an optical amplifier according to a fifth embodiment of the present invention.

FIG. 13 is a block diagram showing a constitution of an optical amplifier according to the fifth embodiment.

The present optical amplifier shown in FIG. 13 is provided with: a variable gain equalizer (VGEQ) 63, instead of the fixed gain equalizer 51C for compensating for the tilt caused at the EDFA 51 of the preceding stage, for the constitution of the fourth embodiment shown in FIG. 12; and a monitoring part 62 utilizing the monitoring method of the present invention so as to control the gain equalizing characteristic of the variable gain equalizer 63.

It is assumed that the variable gain equalizer 63 has a basic gain equalizing characteristic designed corresponding to the gain wavelength characteristic of the EDFA 51, and this gain equalizing characteristic can be varied in response to the variation of the linear tilt caused due to such as loss wavelength characteristics of optical transmission paths to be connected to the present optical amplifier.

The monitoring part 62 receives a part of the output light from the variable gain equalizer 63, measures light power for the measuring wavelength regions according to the channel information from the monitoring signal processing part 54 to thereby obtain the light power deviations of the monitor light, and generates a control signal for adjusting the gain equalizing characteristic of the variable gain equalizer 63 corresponding to the obtained result.

In the optical amplifier having such a constitution, the WDM signal light input into the input port IN are sent to the EDFA 51, collectively amplified thereby, and gain equalized by the variable gain equalizer 63. The gain equalizing characteristic of the variable gain equalizer 63 at this time is controlled by the control signal output from the monitoring part 62. Similarly to the aforementioned operation of the monitoring part 60 at the succeeding stage, the target value and measured value of the light power ratio for respective measuring wavelength regions are obtained at the monitoring part 62 corresponding to the channel information from the monitoring signal processing part 54, and the gain equalizing characteristic of the variable gain equalizer 63 is controlled so that the measured value becomes equal to the target value. The WDM signal light passed through the variable gain equalizer 63 are sent to the optical amplifying part of the succeeding stage via the variable optical attenuator 53 and dispersion compensating fiber 55, and there is conducted the same operation with the aforementioned fourth embodiment.

According to the fifth embodiment as described above, also the optical amplifying part of the preceding stage is provided with the monitoring part 62 and variable gain equalizer 63 applied with the monitoring method of the present invention, thereby enabling the provision of an optical amplifier capable of assuredly performing the gain equalization of the WDM signal light.

Figure 14:
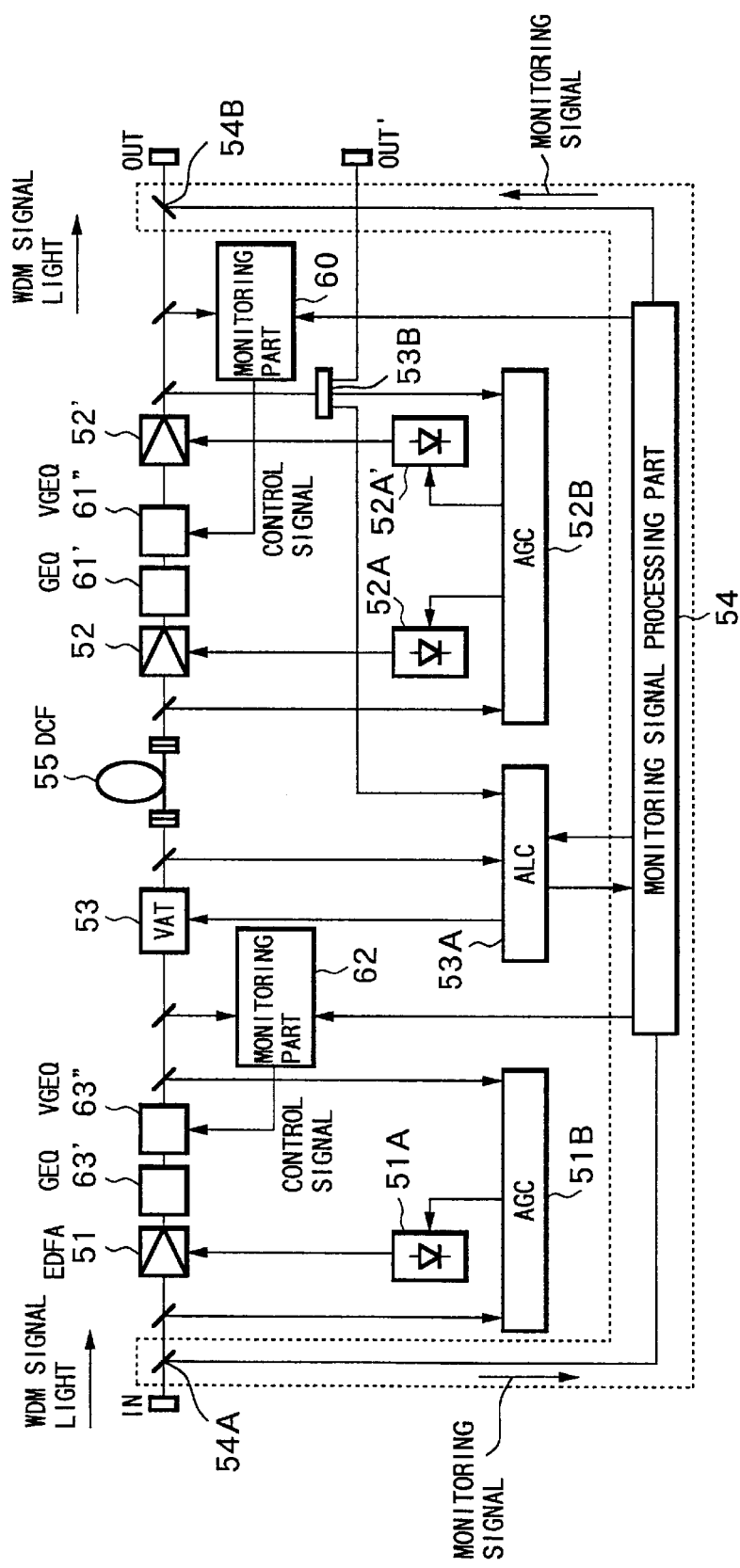
FIG. 14 is a block diagram showing a constitution of a combination of fixed and variable gain equalizers concerning the fifth embodiment.

In the fifth embodiment, the description has been conducted by assuming that the variable gain equalizer 63 has a gain equalizing characteristic corresponding to the tilt caused such as at the optical amplifying part of the preceding stage and the optical transmission paths. However, when it is difficult to realize such a variable gain equalizing characteristic by a single optical equalizer, it is possible to combine a gain equalizer (GEQ) 63' having a fixed gain equalizing characteristic designed corresponding to the complicated gain wavelength characteristics of the EDFA 51, with a gain equalizer (VGEQ) 63" having a variable gain equalizing characteristic designed corresponding to the linear tilt caused such as in optical transmission paths, as shown in FIG. 14. Although the succeeding stage side of the optical amplifier in FIG. 14 exemplarily has the combination of fixed and variable gain equalizers, it is of course possible that only one of the preceding and succeeding stage sides adopts such a combined gain equalizer.

There will be described hereinafter an optical amplifier according to a sixth embodiment of the present invention.

In this sixth embodiment, there is considered such a situation that the gain equalization is conducted by applying the monitoring method of the present invention to a known type optical amplifier in which two or more types of optical amplifying parts having light amplification bands different from each other are parallelly connected, which optical amplifier is expected to be the means capable of realizing large-capacity amplification-repeating transmission in an ultra-wide band.

Figure 15:
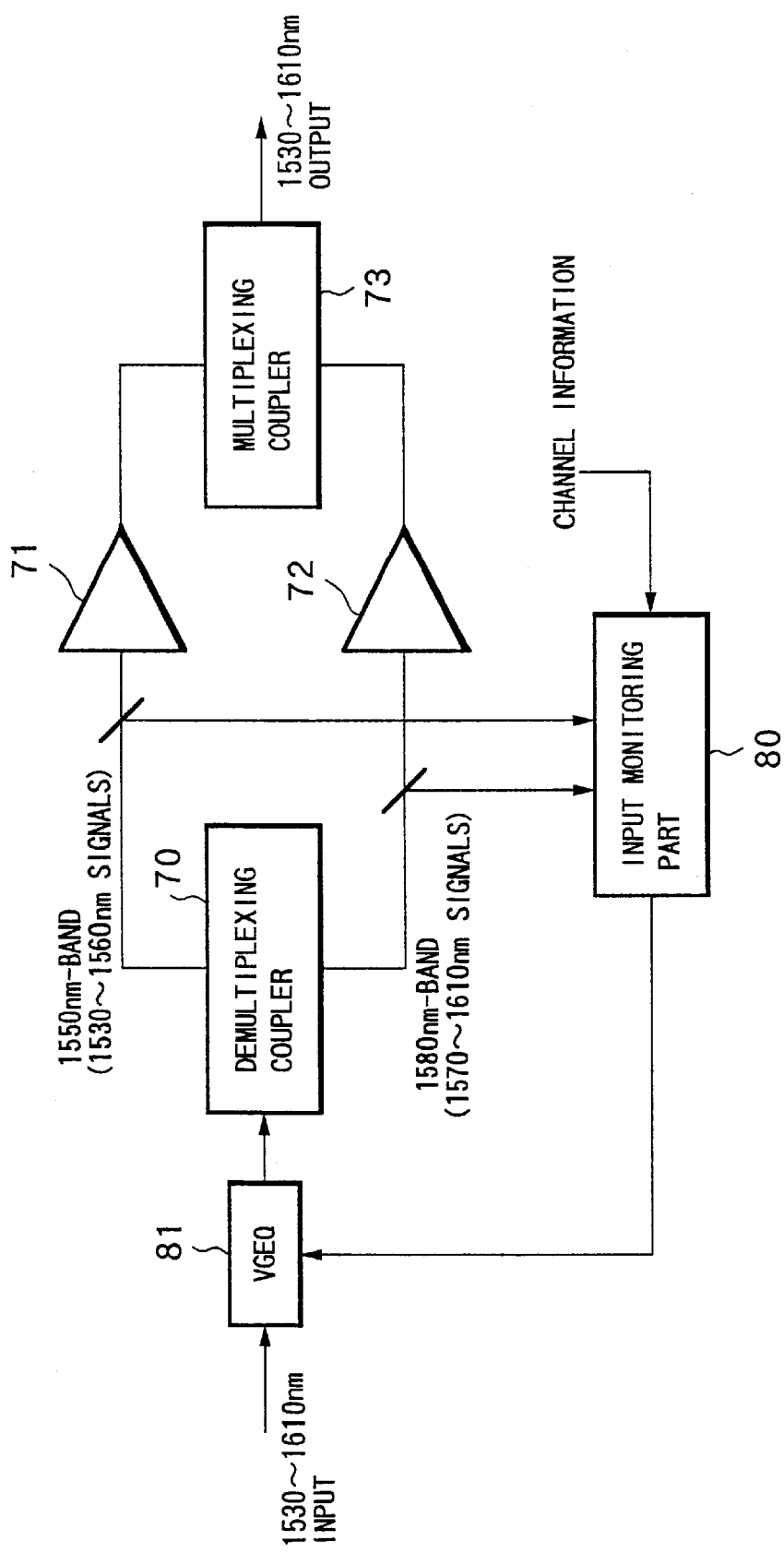
FIG. 15 is a block diagram showing a constitution of an optical amplifier according to a sixth embodiment of the present invention.

FIG. 15 is a block diagram showing a constitution of an optical amplifier according to the sixth embodiment.

In FIG. 15, the present optical amplifier firstly includes such a known constitution comprising: a demultiplexing coupler 70 as demultiplexing means for demultiplexing the input WDM signal light into two amplification-wavelength bands of 1,530 to 1,570 nm (hereinafter called "1,550 nm-band") and 1,570 to 1,610 nm (hereinafter called "1580 nm-band"), a 1,550 nm-band optical amplifying part 71 for amplifying the signal light of the 1,550 nm-band demultiplexed at the demultiplexing coupler 70, a 1580 nm-band optical amplifying part 72 for amplifying the signal light in the 1580 nm-band demultiplexed at the demultiplexing coupler 70, and a multiplexing coupler 73 as multiplexing means for multiplexing the signal light output from the optical amplifying parts 71, 72. In such a known constitution, there are provided: an input monitoring part 80 for receiving a part of the light input into the optical amplifying parts 71, 72, respectively, and a variable optical equalizer (VGEQ) 81 as variable gain equalizing means, which is inserted into the preceding stage at an input side of the demultiplexing coupler 70, and the variable gain equalizing characteristic of which is adjusted in accordance with the control signal from an input monitoring part 80. Here, the 1,550 nm-band optical amplifying part 71 and 1580 nm-band optical amplifying part 72 correspond to optical amplifying means, while the input monitoring part 80 functions as both input power measuring means and controlling means.

As the 1,550 nm-band optical amplifying part 71, it is possible to use a common optical amplifier such as an erbium doped fiber amplifier (EDFA) having its amplification band over a 1,550 nm-band. As the 1580 nm-band optical amplifying part 72, it is possible to use an optical amplifier having an optical amplification effect to be exhibited in a 1580 nm-band, such as by prolonging an erbium doped fiber for a 1,550 nm-band EDFA.

The input monitoring part 80 has a function: to receive monitor light as a result of branching a part of the input light into the 1,550 nm-band optical amplifying part 71, to thereby monitor the total input-light power of the WDM signal light in the 1,550 nm-band, and to receive monitor light as a result of branching a part of the input light into the 1580 nm-band optical amplifying part 72, to thereby monitor the total input-light power of the WDM signal light in the 1580 nm-band. This monitoring function for the total input-light power can be constitutionally simplified by utilizing input monitoring functions provided in the optical amplifying parts 71, 72 (such as an input monitoring function for AGC). Further, the input monitoring part 80 calculates a target value for a total input-power ratio for the optical amplifying parts 71, 72 corresponding to the channel information such as discriminated by monitoring signal processing parts (not shown) provided in the optical amplifying parts 71, 72, respectively, to output a control signal for adjusting the gain equalizing characteristic of the variable optical equalizer 81 so that the target value becomes equal to an actually measured value.

The variable optical equalizer 81 has a variable gain equalizing characteristic designed corresponding to the loss wavelength characteristics of such as optical transmission paths to be connected to the present optical amplifier, and has a function identical with that of the light-equalizing part 1 in the first through third embodiments.

The operation of the optical amplifier having the aforementioned constitution will be concretely described hereinafter with reference to FIG. 16.

Figure 16:
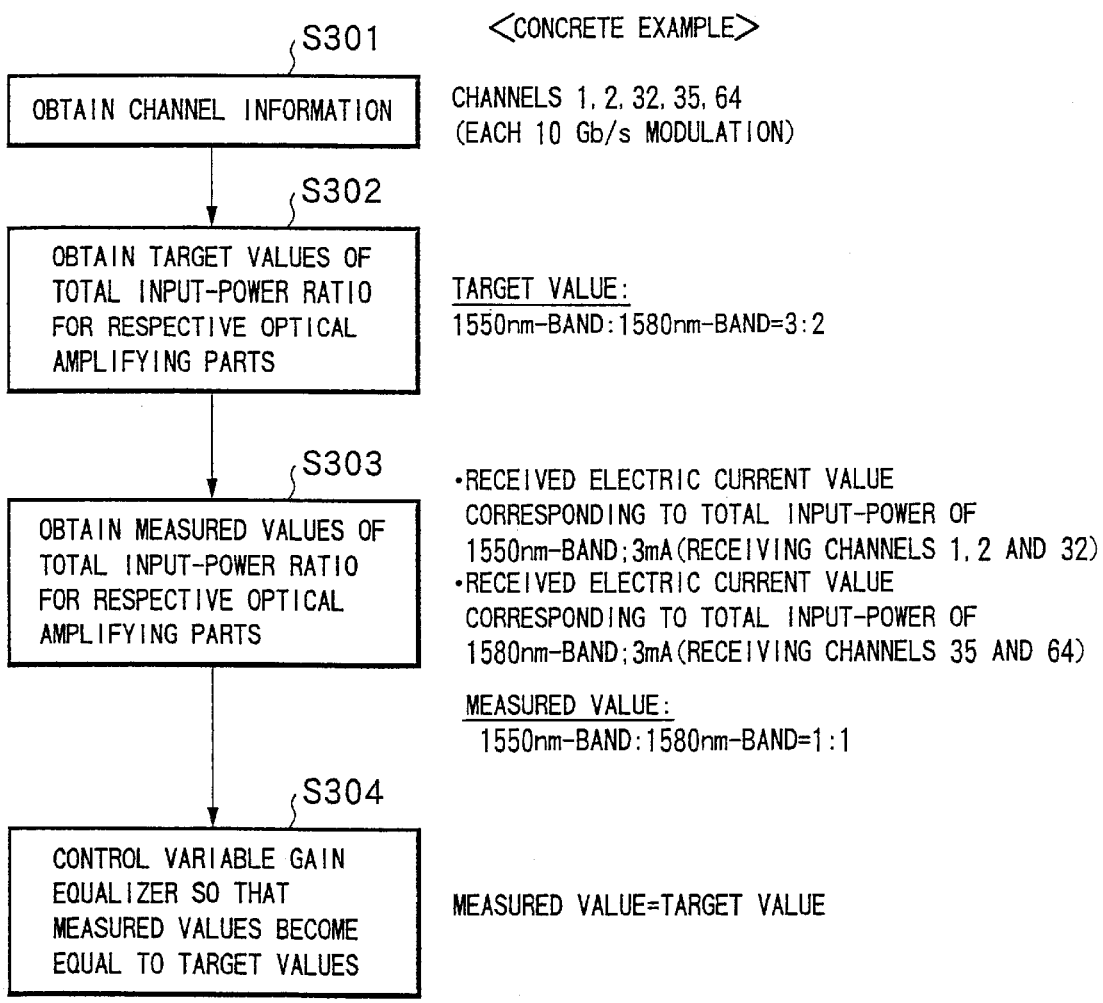
FIG. 16 is a flowchart explaining the operation of the sixth embodiment.
Figure 17:
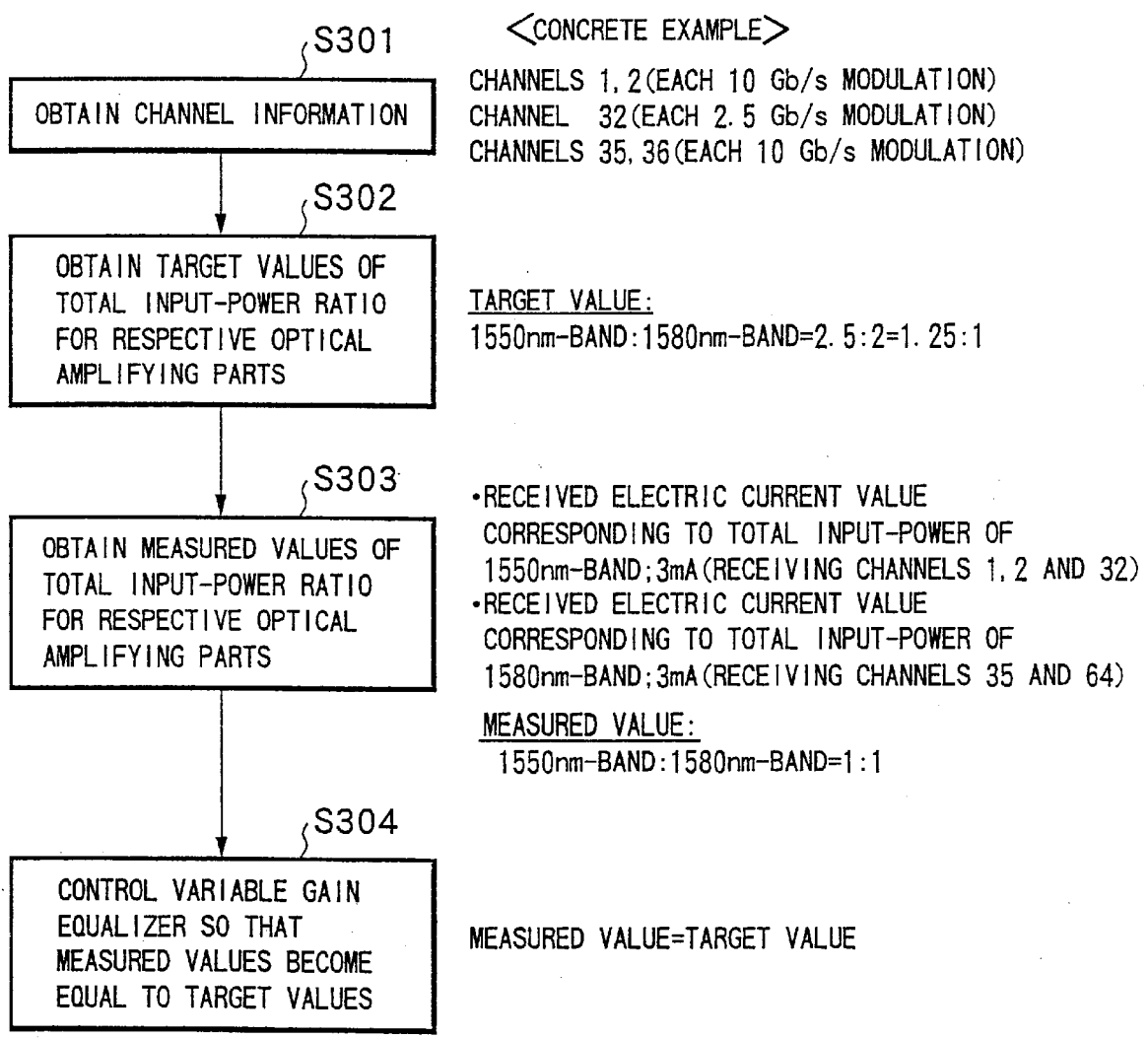
FIG. 17 is a flowchart explaining the operation when the bit rates of respective channels are different from one another concerning the sixth embodiment.

In the present optical amplifier, there is firstly discriminated channel information to be transmitted by the monitoring signal light, and this channel information is passed to the input monitoring part 80, at step 301 of FIG. 16. Herein, as a concrete example of the channel information, the following description is conducted by assuming that the numbers of the channels included in the WDM signal light are 1, 2, 32, 35 and 64, and the bit rates of respective channels are all 10 Gbs/s. Note, the channels 1 through 32 are arranged in the 1,550 nm-band at predetermined wavelength intervals, while the channels 33 through 64 are arranged in the 1580 nm-band at predetermined wavelength intervals.

At step 302, there is obtained a target value of a total input-power ratio for the respective optical amplifying parts 71, 72 at the input monitoring part 80, based on the channel information. In this case, three channels (1, 2 and 32) and two channels (35 and 64) are included in the 1,550 nm-band and 1580 nm-band, respectively, so that the total input-power ratio as the target value becomes 1,550 nm-band: 1580 nm-band=3:2.

After completion of the calculation of the target value or parallelly to such a calculation, the total input-light power to the respective optical amplifying parts are actually measured by the input monitoring part 80 to thereby obtain a measured value of the total input-power ratio for the respective optical amplifying parts 71, 72, at step 303. Here, supposing that both the received light electric current values corresponding to the total input-light power to the optical amplifying parts 71, 72 are 3 mA, the measured value of the total input-power ratio becomes 1,550 nm-band: 1580 nm-band=1:1.

Upon completion of the calculation of the measured value, the flow advances to step 304 where there is generated a control signal for adjusting the gain equalizing characteristic of the variable optical equalizer 81 so that the measured value of the total input-power ratio for optical amplifying parts 71, 72 becomes equal to the target value. This control signal is sent to the variable optical equalizer 81. In this way, the tilt caused such as in the transmission paths connected to the present optical amplifier can be assuredly equalized, so that WDM signal light having equalized light power for respective channels are input into the optical amplifying parts 71, 72 for the respective wavelength bands via the demultiplexing coupler 70. Further, the respective signal light amplified at the optical amplifying parts 71, 72, are multiplexed by the multiplexing coupler 73 and then output to the outside of the present optical amplifier.

According to the sixth embodiment as described above, in the optical amplifier having two type optical amplifying parts parallelly connected to each other and having light amplification bands different from each other, there is provided the input monitoring part 80 for monitoring the total input-light power of the respective optical amplifying parts, and the gain equalizing characteristic of the variable optical equalizer 81 provided at the input end of the present optical amplifier is controlled such that the measured value of the total input-power ratio for the respective optical amplifying parts as obtained by the input monitoring part 80 becomes equal to the target value. Thus, it becomes possible to assuredly compensate the tilt of the signal light to be input into the respective optical amplifying parts, by a simplified monitoring method. Particularly, in amplifying WDM signal light of a wider wavelength band, it is useful, from the viewpoint of improvement of a noise figure, that the loss wavelength characteristics of optical transmission paths to be caused due to such as a stimulated Raman scattering effect are reduced in advance at the input side of the optical amplifier.

In the sixth embodiment, there has been described a situation where the bit rates of respective channels are the same. However, the present invention can be also applied to a situation where the bit rates of respective channels are different from each other. Concretely, when the channel information obtained at step 301 represents, for example, that the bit rates for the channels 1, 2, 35 and 64 are 10 Gb/s (target output level: 7 dBm/ch) and the bit rate for the channel 32 is 2.5 Gb/s (target output level: 4 dBm/ch), the target value of the total input-power ratio for the respective optical amplifying parts to be obtained at step 302 becomes 1,550 nm-band: 1580 nm-band=2.5:2=1.25:1 because the channel light power of 2.5 Gb/s becomes ½ times of that of 10 Gbs/s.

Figure 18:
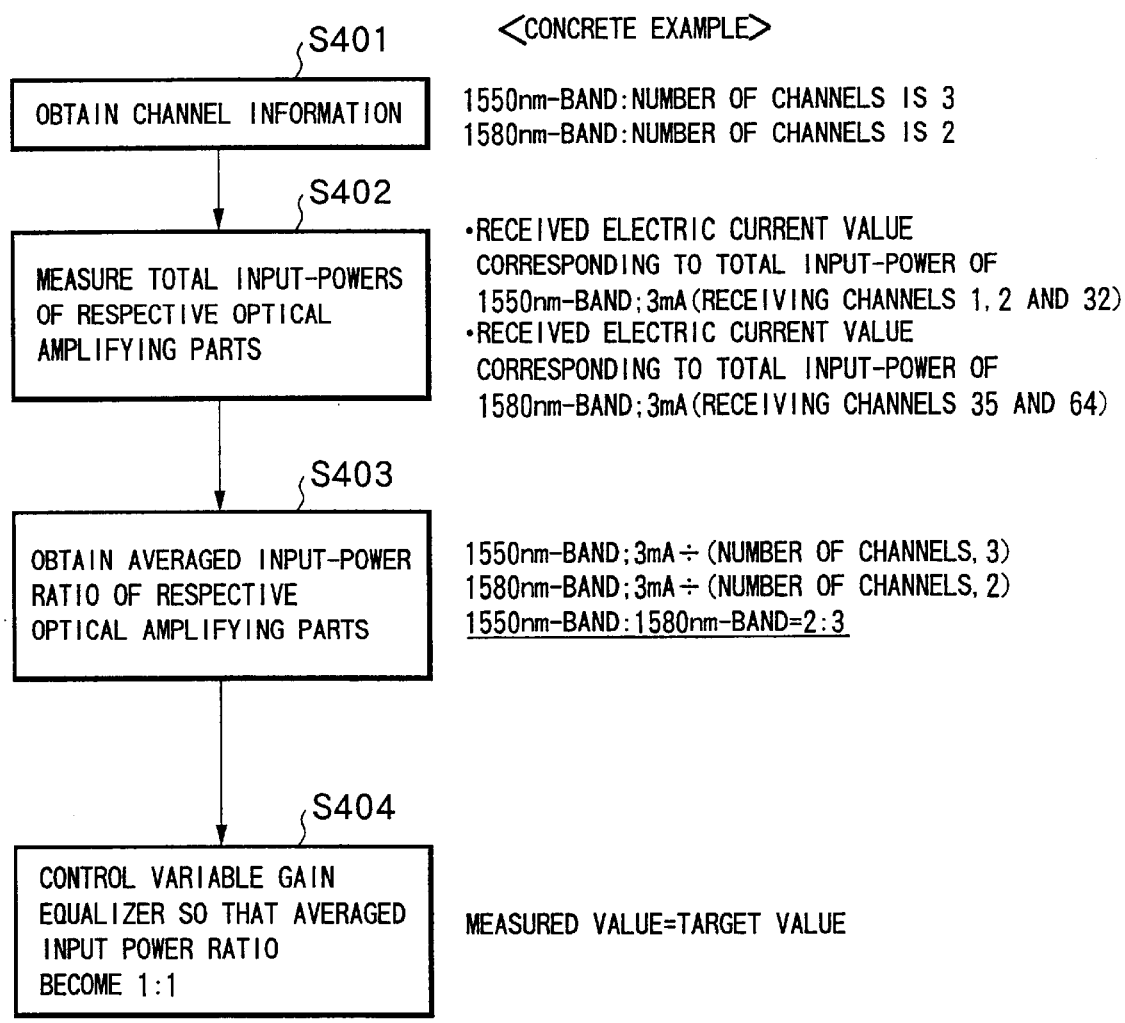
FIG. 18 is a flowchart explaining the operation when channel information is simplified where the bit rates of respective channels are the same concerning the sixth embodiment.

Particularly, when the bit rates of respective channels are the same and the target output levels are the same, it is possible to simplify the channel information. Namely, it is enough that the channel information includes the number of channels in the 1,550 nm-band and that in the 1580 nm-band. In this case, for example, as shown in FIG. 18, it is enough: to obtain the ratio between the averaged input powers (per a channel) of the respective optical amplifying parts at step 403 making use of the numbers of respective channels obtained at step 401 and the total input-light power measured at step 402 for the respective optical amplifying parts, and to control the gain equalizing characteristic of the variable optical equalizer 81 at step 404 so that the ratio of the averaged input powers becomes 1550 nm-band: 1580 nm-band=1:1.

Further, the sixth embodiment has been described about a situation where two types of 1,550 nm-band optical amplifying part and 1580 nm-band optical amplifying part are parallelly provided. However, the present invention is not limited thereto, and can be applied, in the same manner with the above, to an optical amplifier including three or more types of optical amplifying parts parallelly connected to one another and having amplification bands different from one another.

We claim:

1. A method for monitoring inter-wavelength light power deviations, comprising the steps of:

obtaining channel information concerning WDM signal light including a plurality of wavelength-division multiplexed channel light having wavelengths different from one another;

setting, based on said channel information, a plurality of measuring wavelength regions each including at least one distinctive channel light;

measuring channel light power of said WDM signal light, for only said respective measuring wavelength regions; and obtaining light power ratio for said plurality of measuring wavelength regions making use of measured values of said light power, to thereby judge the inter-wavelength light power deviations of said WDM signal light.

2. A method for monitoring inter-wavelength light power deviations of claim 1, wherein said step of setting said measuring wavelength regions sets at least a first measuring wavelength region including the shortest wavelength channel light and a second measuring wavelength region including the longest wavelength channel light.

3. A method for monitoring inter-wavelength light power deviations of claim 1, wherein said step of setting said measuring wavelength regions sets said measuring wavelength regions such that the inclusion ratio of noise light becomes minimum.

4. A method for monitoring inter-wavelength light power deviations of claim 1, wherein said step of obtaining said channel information obtains said channel information including the wavelength positions and the transmission rates of respective channel light in said WDM signal light, based on monitoring signal light transmitted together with said WDM signal light.

5. An optical equalizer for equalizing wavelength characteristics of the light power of WDM signal light including a plurality of wavelength-division multiplexed channel light having wavelengths different from one another, said optical equalizer comprising:

variable light-equalizing means having a variable light equalizing characteristic, to which is input said WDM signal light;

channel information obtaining means for obtaining channel information concerning said WDM signal light;

wavelength region setting means for setting, based on said channel information obtained by said channel information obtaining means, a plurality of measuring wavelength regions each including at least one distinctive channel light;

light power measuring means for measuring channel light power of said WDM signal light passed through said variable light-equalizing means, for only said plurality of measuring wavelength regions set by said wavelength region setting means; and controlling means for obtaining, based on said channel information obtained by said channel information obtaining means, those target values of light power ratio for respective measuring wavelength regions, to flatten the light power wavelength characteristics of said WDM signal light and for obtaining measured values of light power ratio for the respective measuring wavelength regions, making use of the measured result of said light power measuring means, to control the light equalizing characteristic of said variable light-equalizing means so that said measured values become equal to said target values, respectively.

6. An optical equalizer of claim 5, wherein said light power measuring means includes:
   a diffraction grating for receiving a part of said WDM signal light passed through said variable light-equalizing means, to thereby generate diffracted light; and
   a light receiving part which has a plurality of photodetectors arranged corresponding to the arriving positions of respective channel light diffracted by said diffraction grating and which selects the measured results of light power at said photodetectors corresponding to the respective measuring wavelength regions set by said wavelength region setting means, to pass the thus selected measured results to said controlling means.

7. An optical equalizer of claim 6, wherein said light receiving part includes two or more photodetectors the number of which is equal to or less than the maximum number of channels included in said WDM signal light.

8. An optical equalizer of claim 5, wherein said light power measuring means includes:
   a variable optical filter, which is input with a part of the WDM signal light passed through said variable light-equalizing means, and which has a central wavelength of a transmission band to be shifted in a timewise manner corresponding to the respective measuring wavelength regions set by said wavelength region setting means;
   a light receiving part for measuring powers of channel light passed through said variable optical filter; and
   a selecting part for selecting, from measured results at said light receiving part, data corresponding to the respective measuring wavelength regions set by said wavelength region setting means, to transmit the selected data to said controlling means.

9. An optical amplifier incorporating optical amplifying means for collectively amplifying WDM signal light including a plurality of wavelength-division multiplexed channel light having wavelengths different from one another, said optical amplifier comprising:

variable gain equalizing means having a variable gain equalizing characteristic, to which is input said WDM signal light;

channel information obtaining means for obtaining channel information concerning said WDM signal light;

wavelength region setting means for setting, based on said channel information obtained by said channel information obtaining means, a plurality of measuring wavelength regions each including at least one distinctive channel light;

light power measuring means for measuring channel light power of said WDM signal light passed through said variable gain equalizing means, for only said plurality of measuring wavelength regions set by said wavelength region setting means; and controlling means for obtaining, based on said channel information obtained by said channel information obtaining means, target values of light power ratio for respective measuring wavelength regions, to flatten the light power wavelength characteristics of said WDM signal light, and for obtaining measured values of light power ratio for the respective measuring wavelength regions, making use of the measured result of said light power measuring means, to control the gain equalizing characteristic of said variable gain equalizing means so that said measured values become equal to said target values, respectively.

10. An optical amplifier of claim 9, wherein said light power measuring means includes:
   a diffraction grating for receiving a part of said WDM signal light passed through said variable gain equalizing means, to thereby generate diffracted light; and
   a light receiving part which has a plurality of photodetectors arranged corresponding to the arriving positions of respective channel light diffracted by said diffraction grating and which selects the measured results of light power at said photodetectors corresponding to the respective measuring wavelength regions set by said wavelength region setting means, to pass the thus selected measured results to said controlling means.

11. An optical amplifier of claim 10, wherein said light receiving part includes two or more photodetectors the number of which is equal to or less than the maximum number of channels included in said WDM signal light.

12. An optical amplifier of claim 9, wherein said light power measuring means includes:
   a variable optical filter, which is input with a part of the WDM signal light passed through said variable gain equalizing means, and which has a central wavelength of a transmission band to be shifted in a timewise manner corresponding to the respective measuring wavelength regions set by said wavelength region setting means;
   a light receiving part for measuring powers of channel light passed through said variable optical filter; and
   a selecting part for selecting, from measured results at said light receiving part, data corresponding to the respective measuring wavelength regions set by said wavelength region setting means, to transmit the selected data to said controlling means.

13. An optical amplifier incorporating: demultiplexing means for demultiplexing WDM signal light including a plurality of wavelength-division multiplexed channel light having wavelengths different from one another, into at least two amplification-wavelength bands, at least two optical amplifying means for amplifying optical signals of said respective amplification-wavelength bands, which are demultiplexed by said demultiplexing means, and multiplexing means for multiplexing respective optical signals amplified by said respective optical amplifying means; said optical amplifier comprising:

variable gain equalizing means, which has a variable gain equalizing characteristic and which is provided at the preceding stage of an input side of said demultiplexing means;

channel information obtaining means for obtaining channel information concerning said WDM signal light;

input power measuring means, for receiving a part of optical signals of said respective amplification-wavelength bands to be input into said respective optical amplifying means, to measure the total input-light power into said respective optical amplifying means; and controlling means for obtaining, based on said channel information obtained by said channel information obtaining means, target values of total input-power ratio for respective optical amplifying means, to flatten the light power wavelength characteristics of said WDM signal light and for obtaining measured values of total input light power ratios for said respective measuring wavelength regions, making use of the measured result of said input power measuring means, to control the gain equalizing characteristic of said variable gain equalizing means so that said measured values become equal to said target values, respectively.

14. An optical amplifier of claim 13, wherein said amplification-wavelength bands include a 1550 nm-band and a 1580 nm-band.

* * * * *